US010581655B2

(12) United States Patent
Hassan et al.

(10) Patent No.: US 10,581,655 B2
(45) Date of Patent: Mar. 3, 2020

(54) COGNITIVE MULTI-USER OFDMA

(71) Applicant: MICROSOFT TECHNOLOGY LICENSING, LLC, Redmond, WA (US)

(72) Inventors: Amer A. Hassan, Kirkland, WA (US); Christian Huitema, Clyde Hill, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/657,044

(22) Filed: Mar. 13, 2015

(65) Prior Publication Data
US 2015/0188652 A1 Jul. 2, 2015

Related U.S. Application Data

(63) Continuation of application No. 13/427,494, filed on Mar. 22, 2012, now Pat. No. 9,065,687, which is a
(Continued)

(51) Int. Cl.
*H04L 27/26* (2006.01)
*H04L 5/00* (2006.01)
(Continued)

(52) U.S. Cl.
CPC ............ *H04L 27/2613* (2013.01); *H04J 1/12* (2013.01); *H04J 1/16* (2013.01); *H04J 11/003* (2013.01);
(Continued)

(58) Field of Classification Search
CPC ..... H04W 16/10; H04W 16/14; H04W 24/02; H04W 72/085; H04W 16/28;
(Continued)

(56) References Cited

U.S. PATENT DOCUMENTS 3,343,093 A  9/1967 Van Gerwen
4,210,780 A  7/1980 Hopkins et al.
(Continued)

FOREIGN PATENT DOCUMENTS

CN  1462523 A  12/2003
CN  1468486 A  4/2004
(Continued)

OTHER PUBLICATIONS

PCT International Search Report and Written Opinion for Application No. PCT/US2008/087860, dated May 21, 2009.
(Continued)

*Primary Examiner* — Khaled M Kassim
*Assistant Examiner* — Najeeb Ansari
(74) *Attorney, Agent, or Firm* — Mark K. Young; Mayer & Williams PC

(57) ABSTRACT

A computing device operating according to a frequency division multiplexed protocol in which communication occurs over a signal formed from a plurality of sub-channels selected from anywhere in a frequency spectrum. A computing device may select sub-channels cognitively by using information about sub-channels previously deemed suitable or unsuitable by that computing device or other computing devices. A described technique for determining sub-channel suitability includes analyzing radio frequency energy in the sub-channel to detect signals generated by another computing device or high noise levels. Information may also be used to cognitively select sub-channels to be analyzed, such as by first selecting for analysis previously-used sub-channels.

19 Claims, 6 Drawing Sheets

Related U.S. Application Data continuation of application No. 11/637,449, filed on Dec. 12, 2006, now Pat. No. 8,144,793.

(51) Int. Cl.

| | | |
|---|---|---|
| *H04W 16/10* | (2009.01) | |
| *H04L 27/00* | (2006.01) | |
| *H04J 1/16* | (2006.01) | |
| *H04J 11/00* | (2006.01) | |
| *H04L 27/16* | (2006.01) | |
| *H04J 1/12* | (2006.01) | |
| *H04L 5/02* | (2006.01) | |

(52) U.S. Cl.
CPC ........ *H04J 11/0066* (2013.01); *H04L 5/0007* (2013.01); *H04L 5/0016* (2013.01); *H04L 5/0032* (2013.01); *H04L 5/0037* (2013.01); *H04L 5/0064* (2013.01); *H04L 5/0073* (2013.01); *H04L 27/0006* (2013.01); *H04L 27/16* (2013.01); *H04L 27/2627* (2013.01); *H04W 16/10* (2013.01); *H04L 5/0039* (2013.01); *H04L 5/0058* (2013.01); *H04L 5/023* (2013.01)

(58) Field of Classification Search
CPC ... H04W 88/08; H04W 88/10; H04W 72/042; H04W 16/02
USPC .................................. 370/328, 329
See application file for complete search history.

(56) References Cited

U.S. PATENT DOCUMENTS

| | | |
|---|---|---|
| 5,504,775 A | 4/1996 | Chouly et al. |
| 5,675,572 A | 10/1997 | Hidejima |
| 5,729,535 A | 3/1998 | Rostoker |
| 5,781,543 A | 7/1998 | Ault |
| 5,787,391 A | 7/1998 | Moriya et al. |
| 5,790,516 A | 8/1998 | Gudmundson et al. |
| 5,852,630 A | 12/1998 | Langberg |
| 5,867,478 A | 2/1999 | Baum et al. |
| 6,041,048 A | 3/2000 | Erickson et al. |
| 6,175,550 B1 | 1/2001 | Van Nee |
| 6,229,471 B1 | 5/2001 | Herrmann |
| 6,295,272 B1 | 9/2001 | Feldman et al. |
| 6,304,611 B1 | 10/2001 | Miyashita et al. |
| 6,445,773 B1 | 9/2002 | Liang |
| 6,456,653 B1 | 9/2002 | Sayeed |
| 6,553,534 B2 | 4/2003 | Yonge et al. |
| 6,609,039 B1 | 8/2003 | Schoen |
| 6,654,431 B1 | 11/2003 | Barton et al. |
| 6,704,072 B2 | 3/2004 | Jeong et al. |
| 6,704,572 B1 | 3/2004 | Whinnett |
| 6,711,141 B1 | 3/2004 | Rinne |
| 6,721,267 B2 | 4/2004 | Hiben et al. |
| 6,726,297 B1 | 4/2004 | Uesugi |
| 6,728,551 B2 | 4/2004 | Chang |
| 6,760,300 B1 | 7/2004 | Eberle |
| 6,763,072 B1 | 7/2004 | Matsui et al. |
| 6,810,006 B2 | 10/2004 | Michon et al. |
| 6,870,808 B1 | 3/2005 | Liu et al. |
| 6,882,851 B2 | 4/2005 | Sugar et al. |
| 6,904,283 B2 | 6/2005 | Li et al. |
| 6,934,246 B2 | 8/2005 | Park |
| 6,934,340 B1 | 8/2005 | Dollard |
| 6,952,454 B1 | 10/2005 | Jalali et al. |
| 6,961,388 B2 | 11/2005 | Ling et al. |
| 6,976,202 B1 | 12/2005 | Rezvani et al. |
| 6,987,729 B1 | 1/2006 | Gopalakrishnan et al. |
| 6,990,059 B1 | 1/2006 | Anikhindi |
| 7,012,883 B2 | 3/2006 | Jalali et al. |
| 7,020,071 B2 | 3/2006 | Mujtaba |
| 7,020,073 B2 | 3/2006 | Kadous et al. |
| 7,020,110 B2 | 3/2006 | Walton |
| 7,035,201 B2 | 4/2006 | Fu |
| 7,043,023 B2 | 5/2006 | Watanabe et al. |
| 7,043,681 B2 | 5/2006 | Kroeger et al. |
| 7,047,032 B2 | 5/2006 | Yun |
| 7,072,413 B2 | 7/2006 | Walton et al. |
| 7,075,967 B2 | 7/2006 | Struhsaker et al. |
| 7,076,246 B2 | 7/2006 | Chitrapu |
| 7,126,984 B2 | 10/2006 | Wang |
| 7,133,471 B2 | 11/2006 | Feher |
| 7,139,320 B1 | 11/2006 | Singh |
| 7,151,755 B2 | 12/2006 | Xu |
| 7,151,925 B2 | 12/2006 | Ting et al. |
| 7,164,649 B2 | 1/2007 | Walton et al. |
| 7,206,350 B2 | 4/2007 | Korobkov et al. |
| 7,206,840 B2 | 4/2007 | Choi et al. |
| 7,286,603 B2 | 10/2007 | Varshney |
| 7,317,750 B2 | 1/2008 | Shattil |
| 7,324,437 B1 | 1/2008 | Czylwik |
| 7,333,531 B2 | 2/2008 | Alamouti |
| 7,356,343 B2 | 4/2008 | Feher |
| 7,356,679 B1 | 4/2008 | Le |
| 7,391,815 B2 | 6/2008 | Lakkis |
| 7,414,964 B2 | 8/2008 | Hashem |
| 7,415,085 B2 | 8/2008 | Fujii |
| 7,430,257 B1 | 9/2008 | Shattil |
| 7,448,034 B2 | 11/2008 | Anderson |
| 7,450,059 B1 | 11/2008 | Seddon |
| 7,450,559 B2 | 11/2008 | Schotten |
| 7,551,641 B2 | 6/2009 | Pirzada |
| 7,570,953 B2 | 8/2009 | Maltsev |
| 7,596,127 B1 | 9/2009 | May |
| 7,612,381 B2 | 11/2009 | Kamiyama et al. |
| 7,623,599 B2 | 11/2009 | McCoy |
| 7,627,048 B2 | 12/2009 | Larsson |
| 7,634,016 B2 | 12/2009 | Hassan |
| 7,643,583 B1 | 1/2010 | Savoj et al. |
| 7,643,811 B2 | 1/2010 | Reunamaki |
| 7,672,221 B2 | 3/2010 | Fuji |
| 7,672,381 B1 | 3/2010 | Kleider |
| 7,684,473 B2 | 3/2010 | Walton et al. |
| 7,800,541 B2 | 9/2010 | Moshfeghi |
| 7,813,701 B2 | 10/2010 | Strong |
| 7,855,948 B2 | 12/2010 | Anikhindi |
| 7,860,047 B2 | 12/2010 | Urushihara |
| 7,877,110 B2 | 1/2011 | Feher |
| 7,920,823 B2 | 4/2011 | Hassan |
| 7,929,623 B2 | 4/2011 | Hassan |
| 7,933,344 B2 | 4/2011 | Hassan et al. |
| 7,970,085 B2 | 6/2011 | Hassan et al. |
| 8,045,935 B2 | 10/2011 | Lakkis |
| 8,060,033 B2 | 11/2011 | Himayat |
| 8,072,957 B2 | 12/2011 | Gross |
| 8,144,793 B2 | 3/2012 | Hassan |
| 8,166,534 B2 | 4/2012 | Yariv |
| 8,189,621 B2 | 5/2012 | Hassan |
| 8,228,850 B2 | 7/2012 | McBeath |
| 8,249,001 B2 | 8/2012 | Oota |
| 8,289,837 B2 | 10/2012 | Kim |
| 8,311,140 B2 | 11/2012 | Feher |
| 8,320,506 B2 | 11/2012 | Jo et al. |
| 8,374,130 B2 | 2/2013 | Hassan |
| 8,462,902 B1 * | 6/2013 | Barnickel, Jr. .......... H04B 3/54 370/389 |
| 8,509,265 B2 | 8/2013 | Hassan et al. |
| 8,718,211 B2 | 5/2014 | Hassan et al. |
| 8,842,752 B2 | 9/2014 | Hassan et al. |
| 8,902,820 B2 | 12/2014 | Cordeiro |
| 8,923,340 B2 | 12/2014 | Hassan et al. |
| 9,065,687 B2 | 6/2015 | Hassan |
| 9,363,120 B2 | 6/2016 | Hassan |
| 9,363,795 B2 | 6/2016 | Hassan |
| 9,386,055 B2 | 7/2016 | Hassan |
| 9,641,273 B2 | 5/2017 | Hassan |
| 9,742,529 B2 | 8/2017 | Hassan |
| 9,755,879 B2 | 9/2017 | Hassan et al. |
| 9,774,415 B2 | 9/2017 | Hassan et al. |
| 9,866,418 B2 | 1/2018 | Hassan et al. |
| 2001/0007552 A1 | 7/2001 | Schiff |

(56) References Cited

U.S. PATENT DOCUMENTS

| | | |
|---|---|---|
| 2002/0009158 A1 | 1/2002 | Souissi et al. |
| 2002/0015058 A1 | 2/2002 | Azuma |
| 2002/0031189 A1 | 3/2002 | Hiben et al. |
| 2002/0080902 A1 | 6/2002 | Kim |
| 2002/0119181 A1 | 8/2002 | Muszynska |
| 2002/0119781 A1 | 8/2002 | Li et al. |
| 2002/0136190 A1 | 9/2002 | Hata |
| 2002/0141446 A1 | 10/2002 | Koga |
| 2002/0157058 A1 | 10/2002 | Ariel |
| 2002/0188723 A1 | 12/2002 | Choi et al. |
| 2003/0015423 A1 | 1/2003 | LaGreca |
| 2003/0026200 A1 | 2/2003 | Fu et al. |
| 2003/0048856 A1 | 3/2003 | Ketchum et al. |
| 2003/0058786 A1 | 3/2003 | Sato et al. |
| 2003/0067961 A1 | 4/2003 | Hudson |
| 2003/0095506 A1 | 5/2003 | Jalali |
| 2003/0112880 A1 | 6/2003 | Walton |
| 2003/0123383 A1 | 7/2003 | Korobkov et al. |
| 2003/0154233 A1 | 8/2003 | Patterson |
| 2003/0223354 A1 | 12/2003 | Olszewski |
| 2003/0236080 A1 | 12/2003 | Kadous |
| 2004/0005010 A1 | 1/2004 | He et al. |
| 2004/0008618 A1 | 1/2004 | Shirakata et al. |
| 2004/0027997 A1 | 2/2004 | Terry et al. |
| 2004/0029575 A1 | 2/2004 | Mehta |
| 2004/0066773 A1* | 4/2004 | Sun .................... H04L 25/022 370/343 |
| 2004/0073929 A1 | 4/2004 | Morello |
| 2004/0081121 A1 | 4/2004 | Xu |
| 2004/0110510 A1 | 6/2004 | Jeon |
| 2004/0151108 A1 | 8/2004 | Claret et al. |
| 2004/0151109 A1 | 8/2004 | Batra et al. |
| 2004/0252775 A1 | 12/2004 | Park |
| 2004/0252781 A1 | 12/2004 | Park |
| 2005/0002325 A1 | 1/2005 | Giannakis et al. |
| 2005/0013238 A1 | 1/2005 | Hensen |
| 2005/0013284 A1 | 1/2005 | Proctor |
| 2005/0025039 A1 | 2/2005 | Hwang et al. |
| 2005/0027789 A1 | 2/2005 | Luo et al. |
| 2005/0045001 A1 | 3/2005 | Huang |
| 2005/0047259 A1 | 3/2005 | Ahn |
| 2005/0063345 A1 | 3/2005 | Wu et al. |
| 2005/0078759 A1 | 4/2005 | Zhang |
| 2005/0085249 A1 | 4/2005 | Goldstein |
| 2005/0099937 A1 | 5/2005 | Oh et al. |
| 2005/0111462 A1 | 5/2005 | Walton |
| 2005/0117661 A1 | 6/2005 | Kim |
| 2005/0129136 A1 | 6/2005 | Fujii |
| 2005/0130684 A1* | 6/2005 | Kim ..................... H04L 1/06 455/464 |
| 2005/0141649 A1 | 6/2005 | Tanabe |
| 2005/0147076 A1 | 7/2005 | Sadowsky |
| 2005/0152466 A1 | 7/2005 | Maltsev |
| 2005/0157670 A1 | 7/2005 | Tang et al. |
| 2005/0157805 A1 | 7/2005 | Walton |
| 2005/0160428 A1 | 7/2005 | Ayachitula et al. |
| 2005/0180313 A1 | 8/2005 | Kim |
| 2005/0180374 A1* | 8/2005 | Balachandran ........ H04B 1/713 370/343 |
| 2005/0190800 A1 | 9/2005 | Maltsev |
| 2005/0197132 A1 | 9/2005 | Lee et al. |
| 2005/0201295 A1 | 9/2005 | Kim |
| 2005/0226341 A1* | 10/2005 | Sun .................... H04L 25/022 375/260 |
| 2005/0228850 A1 | 10/2005 | Zhu et al. |
| 2005/0230684 A1 | 10/2005 | Seo et al. |
| 2005/0232208 A1 | 10/2005 | Hanson |
| 2005/0237989 A1 | 10/2005 | Ahn |
| 2005/0245197 A1 | 11/2005 | Kadous et al. |
| 2005/0245258 A1* | 11/2005 | Classon ............... H04L 5/0037 455/434 |
| 2005/0249127 A1 | 11/2005 | Huo |
| 2005/0254457 A1 | 11/2005 | Jung et al. |
| 2005/0270987 A1 | 12/2005 | Chen |
| 2005/0281317 A1 | 12/2005 | Oh et al. |
| 2006/0008014 A1 | 1/2006 | Tamaki |
| 2006/0009209 A1 | 1/2006 | Rieser |
| 2006/0013285 A1* | 1/2006 | Kobayashi ........... H04B 1/7143 375/132 |
| 2006/0034382 A1 | 2/2006 | Ozluturk |
| 2006/0045001 A1 | 3/2006 | Jalali |
| 2006/0046716 A1 | 3/2006 | Hofstaedter et al. |
| 2006/0056283 A1 | 3/2006 | Anikhindi |
| 2006/0063543 A1 | 3/2006 | Matoba |
| 2006/0067288 A1 | 3/2006 | Shim |
| 2006/0078059 A1 | 4/2006 | Ok |
| 2006/0083157 A1 | 4/2006 | Cheng |
| 2006/0083205 A1 | 4/2006 | Buddhikot |
| 2006/0083210 A1 | 4/2006 | Li et al. |
| 2006/0085497 A1 | 4/2006 | Sehitoglu |
| 2006/0087972 A1 | 4/2006 | Jalali |
| 2006/0094372 A1 | 5/2006 | Ahn |
| 2006/0114925 A1* | 6/2006 | Gerszberg ................ H04B 3/54 370/431 |
| 2006/0126493 A1* | 6/2006 | Hashem ............. H04L 27/2608 370/208 |
| 2006/0128318 A1 | 6/2006 | Agarossi et al. |
| 2006/0135075 A1 | 6/2006 | Tee |
| 2006/0154691 A1 | 7/2006 | Tang et al. |
| 2006/0159120 A1 | 7/2006 | Kim |
| 2006/0171445 A1 | 8/2006 | Batra et al. |
| 2006/0176973 A1 | 8/2006 | Alamouti et al. |
| 2006/0176976 A1 | 8/2006 | Pedersen |
| 2006/0188003 A1 | 8/2006 | Larsson |
| 2006/0188031 A1 | 8/2006 | Liu |
| 2006/0193295 A1 | 8/2006 | White et al. |
| 2006/0211387 A1 | 9/2006 | Pisek et al. |
| 2006/0211395 A1 | 9/2006 | Waltho |
| 2006/0234752 A1 | 10/2006 | Mese |
| 2006/0250944 A1 | 11/2006 | Hong et al. |
| 2006/0269005 A1 | 11/2006 | Laroia et al. |
| 2006/0274820 A1 | 12/2006 | Walton et al. |
| 2006/0274842 A1 | 12/2006 | Pan |
| 2006/0287001 A1 | 12/2006 | Budampati et al. |
| 2007/0002728 A1 | 1/2007 | Fujii |
| 2007/0009056 A1 | 1/2007 | Yeon et al. |
| 2007/0016413 A1 | 1/2007 | Seo et al. |
| 2007/0032220 A1 | 2/2007 | Feher |
| 2007/0055501 A1 | 3/2007 | Aytur et al. |
| 2007/0058583 A1 | 3/2007 | Cho |
| 2007/0064667 A1* | 3/2007 | Rensburg ............ H04L 1/0026 370/346 |
| 2007/0078924 A1 | 4/2007 | Hassan et al. |
| 2007/0086420 A1 | 4/2007 | Schotten |
| 2007/0087772 A1* | 4/2007 | Yi ....................... H04W 52/346 455/522 |
| 2007/0091720 A1 | 4/2007 | Woo et al. |
| 2007/0105576 A1 | 5/2007 | Gupta |
| 2007/0115878 A1 | 5/2007 | Ashish |
| 2007/0116137 A1 | 5/2007 | McCoy |
| 2007/0133387 A1 | 6/2007 | Arslan |
| 2007/0140102 A1 | 6/2007 | Oh |
| 2007/0147485 A1 | 6/2007 | Sakamoto et al. |
| 2007/0189162 A1 | 8/2007 | Song |
| 2007/0189205 A1* | 8/2007 | Terry .................... H04L 1/1812 370/328 |
| 2007/0201503 A1* | 8/2007 | Nishio .................. H04W 52/50 370/437 |
| 2007/0248173 A1 | 10/2007 | Hassan |
| 2007/0248179 A1 | 10/2007 | Hassan et al. |
| 2007/0258525 A1 | 11/2007 | Jacobsen et al. |
| 2007/0263653 A1 | 11/2007 | Hassan et al. |
| 2007/0297525 A1* | 12/2007 | Wu ..................... H04L 1/0003 375/260 |
| 2008/0002733 A1 | 1/2008 | Sutskover |
| 2008/0014880 A1 | 1/2008 | Hyon et al. |
| 2008/0025421 A1* | 1/2008 | Tlich .................. H04L 27/2608 375/260 |
| 2008/0057869 A1 | 3/2008 | Strong |
| 2008/0070610 A1* | 3/2008 | Nishio ................. H04W 74/085 455/509 |
| 2008/0089279 A1 | 4/2008 | Hu |

(56) References Cited

U.S. PATENT DOCUMENTS

| | | |
|---|---|---|
| 2008/0095135 A1 | 4/2008 | Cleveland |
| 2008/0112518 A1 | 5/2008 | Wilhelmsson |
| 2008/0137634 A1 | 6/2008 | Hassan et al. |
| 2008/0165671 A1 | 7/2008 | Larsson |
| 2008/0232340 A1 | 9/2008 | Wan et al. |
| 2008/0232490 A1 | 9/2008 | Gross |
| 2008/0240267 A1 | 10/2008 | Hassan et al. |
| 2008/0253400 A1 | 10/2008 | Carroll |
| 2008/0279291 A1 | 11/2008 | Hassan |
| 2009/0086706 A1 | 4/2009 | Huang |
| 2009/0109914 A1 | 4/2009 | McBeath |
| 2009/0175363 A1 | 7/2009 | Hottinen |
| 2009/0190535 A1 | 7/2009 | Hassan et al. |
| 2009/0262849 A1 | 10/2009 | Jo |
| 2009/0285174 A1 | 11/2009 | Haga |
| 2010/0040167 A1 | 2/2010 | Aoki |
| 2010/0165956 A1 | 7/2010 | Razzell |
| 2010/0173586 A1 | 7/2010 | McHenry et al. |
| 2010/0208852 A1 | 8/2010 | Feher |
| 2011/0116360 A1 | 5/2011 | Wu |
| 2011/0173485 A1 | 7/2011 | Hassan |
| 2011/0235732 A1 | 9/2011 | Hassan |
| 2011/0310930 A1 | 12/2011 | Gerhardt |
| 2012/0128034 A1 | 5/2012 | Feher |
| 2012/0182875 A1 | 7/2012 | Hassan |
| 2012/0201317 A1 | 8/2012 | Hassan |
| 2012/0207233 A1 | 8/2012 | Hassan |
| 2013/0155980 A1 | 6/2013 | Hassan et al. |
| 2014/0098665 A1 | 4/2014 | Hassan et al. |
| 2014/0211872 A1 | 7/2014 | Hassan et al. |
| 2014/0334432 A1 | 11/2014 | Hassan |
| 2014/0376657 A1 | 12/2014 | Agee |
| 2015/0180921 A1 | 6/2015 | Hassan |
| 2015/0188651 A1 | 7/2015 | Hassan et al. |
| 2015/0188655 A1 | 7/2015 | Hassan et al. |
| 2015/0341079 A1 | 11/2015 | Gerakoulis |
| 2016/0261444 A1 | 9/2016 | Hassan |
| 2016/0302102 A1 | 10/2016 | Hassan |
| 2016/0309359 A1 | 10/2016 | Hassan |
| 2017/0134196 A1 | 5/2017 | Hassan |
| 2017/0373897 A1 | 12/2017 | Hassan et al. |

FOREIGN PATENT DOCUMENTS

| | | |
|---|---|---|
| CN | 1675940 A | 9/2005 |
| CN | 1723676 A | 1/2006 |
| CN | 1874334 A | 12/2006 |
| EP | 1 156 598 A2 | 11/2001 |
| EP | 1 199834 A2 | 4/2002 |
| EP | 1 408 710 A1 | 4/2004 |
| EP | 1480400 A1 | 11/2004 |
| EP | 1 560344 A1 | 8/2005 |
| EP | 1 571 773 A2 | 9/2005 |
| EP | 1 578162 A1 | 9/2005 |
| JP | 08-047036 | 2/1996 |
| JP | 09-200863 A | 7/1997 |
| JP | 2001-230744 A | 8/2001 |
| JP | 2001-285236 | 10/2001 |
| JP | 2004-108965 | 6/2004 |
| JP | 2004-158965 A | 6/2004 |
| JP | 2004-172907 A | 6/2004 |
| JP | 2004-274103 A | 9/2004 |
| JP | 2004-350326 A | 12/2004 |
| JP | 2004-537875 A | 12/2004 |
| JP | 2005-086479 A | 3/2005 |
| JP | 2005-167502 A | 6/2005 |
| JP | 2005-244997 A | 9/2005 |
| JP | 2005-260921 A | 9/2005 |
| JP | 2006-094005 A | 4/2006 |
| JP | 2006-157890 A | 6/2006 |
| JP | 2006-287344 A | 10/2006 |
| JP | 2007515903 A | 6/2007 |
| JP | 2007525092 A | 8/2007 |
| KR | 1020050052 A | 6/2005 |
| KR | 20050052847 A | 6/2005 |
| NZ | 505658 | 2/2003 |
| RU | 2180159 C2 | 2/2002 |
| RU | 2186465 C2 | 7/2002 |
| RU | 2219665 C2 | 12/2003 |
| RU | 2237977 C2 | 10/2004 |
| RU | 2280951 C2 | 7/2006 |
| RU | 2298878 C2 | 5/2007 |
| TW | 1256789 B | 6/2006 |
| TW | 1257779 B | 7/2006 |
| WO | 96/23371 A1 | 8/1996 |
| WO | 98/14026 A1 | 4/1998 |
| WO | 00/74415 A1 | 12/2000 |
| WO | 02/32161 | 4/2002 |
| WO | 02/33911 A1 | 4/2002 |
| WO | 02/33925 A2 | 4/2002 |
| WO | 02/49306 A2 | 6/2002 |
| WO | 02/062002 A1 | 8/2002 |
| WO | WO 02093839 A2 | 11/2002 |
| WO | 03/088602 A1 | 10/2003 |
| WO | 2004007549 A1 | 1/2004 |
| WO | 2004/025870 A1 | 3/2004 |
| WO | 2004/042987 A1 | 5/2004 |
| WO | 2004/075499 A1 | 9/2004 |
| WO | 2005/004500 A2 | 1/2005 |
| WO | WO 2006006602 A1 * | 4/2005 |
| WO | 2005/060192 A1 | 6/2005 |
| WO | 2005i066914 | 7/2005 |
| WO | 2005094026 A1 | 10/2005 |
| WO | WO 2005125250 A1 | 12/2005 |
| WO | 2006/004466 | 1/2006 |
| WO | 2006062041 A1 | 6/2006 |
| WO | 2006/090487 A1 | 8/2006 |
| WO | 2007i062754 | 6/2007 |
| WO | WO 2005076557 A1 | 8/2007 |
| WO | 2007/108077 A1 | 9/2007 |

OTHER PUBLICATIONS

CN Notice on the First Office Action for Application No. 200880125896. 9, dated Aug. 27, 2012.

AU Examiner's first report on patent application No. 2007243348, dated May 24, 2010.

CN Notice on the First Office Action for Application No. 200780015172. 4, dated Dec. 30, 2010.

JP Notice of Reason for Rejection for Application No. 2009-507775, dated Mar. 21, 2012.

AU Examiner's first report on patent application No. 2007243349, dated Jul. 12, 2010.

CA Office Action for Application No. 2,646,622, dated Jul. 21, 2014.

CN Notice on the First Office Action for Application No. 200780015143. 8, dated Jan. 24, 2011.

CN Notice on the Second Office Action for Application No. 200780015143.8, dated Jul. 3, 2013.

EP Communication for Application No. 07794367.8-1860 | 2011297 PCT/US200701 0021, dated May 12, 2014.

JP Notice of Rejection for Application No. 2009-507776, dated Mar. 25, 2010.

PCT International Search Report and Written Opinion for Application No. PCT/US2008/062321, dated Sep. 18, 2008.

CN Notice on the First Office Action for Application No. 200880015382. 8, Summary of the First Office Action included, dated Jun. 5, 2012.

CN Notice on the Second Office Action for Application No. 200880015382.8, Summary of the Second Office Action included, dated Feb. 8, 2013.

EP Provision of the minutes for Application No. 08747424.3-1505, dated Feb. 14, 2014.

EP Decision to refuse European Patent Application No. 08747424. 3-1505, dated Feb. 14, 2014.

Chang, "Synthesis of Band-Limited Orthogonal Signals for Multi-channel Data Transmission", The Bell System Technical Journal, Aug. 4, 1966.

TW Search Report for Application No. 096116940, dated Sep. 8, 2010.

(56) References Cited

OTHER PUBLICATIONS

CN Notice on the First Office Action for Application No. 200780016912.6, dated Mar. 31, 2012.
JP Notice of Reason for Rejection for Application No. 2009-509894, dated Mar. 21, 2012.
KR Notice of Preliminary Rejection for Application No. 1 0-2008-7027267, dated Jul. 30, 2013.
Alonistioti, "End-to-End Reconfigurability: Evolution on Reconfiguration Metamodel", OMG SBC 2005, Aug. 17, 2005.
Bard, "Joint Tactical Radio System", Space Coast Communication Systems Inc., Sep. 9, 2003.
Bourse, "End-To-End Reconfigurability (E2R): Enabling Interoperability, Management and Control of Complex Heterogeneous Systems", URSI GA 2005, Oct. 25, 2005.
Schiphorst, "A Bluetooth-enabled HiperLAN/2 receiver", Proceedings of the IEEE 58th Vehicular Technology Conference, Oct. 6-9, 2003.
Sgandurra, "Achieving SCA Compliance for COTS Software Defined Radio", Second Edition, Pentek, Apr. 11, 2006.
CA Office Action for Application No. 2,672,103, dated Nov. 6, 2014.
CA Office Action for Application No. 2,646,967, dated Jul. 11, 2014.
EP Communication for Application No. 07854775.9-1860 / 2127144 PCT/US2007085556, dated May 12, 2014.
Kivanc, "Subcarrier Allocation and Power Control for OFDMA", Conference Record of the Thirty-Fourth Asilomar Conference on Signals, Systems and Computers, Oct. 29-Nov. 1, 2000.
EP Communication for Application No. 08871573.5-1851 /2232804 PCT/US2008087860, dated Jun. 18, 2014.
Akyildiz, "NeXt generation/dynamic spectrum access/cognitive radio wireless networks: A survey", Computer Networks, Elsevier Science Publishers, May 17, 2006.
Fujii, "Multicarrier Assignment with Random pulse for Multicarrier High Speed Decentralized Wireless LAN", The 8th 3 IEEE International Symposium on Personal, Indoor and Mobile Radio Communications, 1997, Waves of the Year 2000, (PIMRC '97), Sep. 1-4, 1997.
EP Communication for Application No. 07794366.0-1860 / 2011296 PCT/US2007010020, dated Apr. 8, 2014.
Kivanc, "Computationally Efficient Bandwidth Allocation and Power Control for OFDMA", IEEE Transactions on Wireless Communications, vol. 2, No. 6, Nov. 2003.
Yin, "An Efficient Multiuser Loading Algorithm for OFDm-based Broadband Wireless Systems", Proceedings of the Global Telecommunications Conference, Nov. 27-Dec. 1, 2000.
Cn Notice on the Fourth Office Action for Application No. 200880015382.8, dated Mar. 14, 2014.
Cabric, Danijela, "A Cognitive Radio Approach for Usage of Virtual Unlicensed Spectrum", published Jun. 2005.
TW Search Report for Application No. 097150662, dated Dec. 20, 2013.
KR Notice of Preliminary Rejection for Application No. 10-2014-7000529, dated Feb. 10, 2014.
EP Summons to attend oral proceedings for Application No. 08747424.3-1505/2143222, dated Jan. 17, 2014.
JP Secondary Office Action for Application No. 2009-541463, dated Dec. 3, 2013.
KR Notice of Preliminary Rejection for Application No. 10-2009-7014172, dated Nov. 25, 2013.
CN Notice on the Third Office Action for Application No. 200880015382.8, Summary of the Third Office Action included, dated Aug. 22, 2013.
EP Summons to attend oral proceedings for Application No. 08747424.3-1505/2143222, dated Sep. 12, 2013.
CN Decision on Rejection for Application No. 200880125896.9, Summary of the Final Rejection included, dated Jul. 29, 2013.
JP Office Action for Application No. 2009-541463, dated Jul. 19, 2013.
JP Notification of reason for rejection for Application No. 2010-544299, Drafting date Jul. 29, 2013.
KR Notice of Preliminary Rejection and Reasons for Rejection for Application No. 10-2008•7025732, dated Jun. 30, 2013.
TW Search Report for Application No. 096114706. Date of Research: Mar. 14, 2013.
"About SDR Technology," 1 http://www.sdrforum.org/pages/aboutSdrTech/aboutSdrTech.asp, 1 pg, 2007.
"Orthogonal Frequency Division Multiple Access," Wikipedia Online Encyclopedia; retrieved from http://en.wikipedia.org/wiki/ofdma; downloaded on Dec. 12, 2006, pp. 1-3.
"Software defined radio," http://www.wipro.com/webpages/insights/softwareradio.htm, 1 pg, 2007.
"Software Defined Radio", http://www.altera.com/end-markets/wireless/software/sdr/wir-sdr.html, 4 pgs.
Atarashi, H., "Broadband packet wireless access appropriate for high-speed and high-capacity throughput," Vehicular Technology Conference, 2001, pp. 566-570, vol. 1, Issue 2001.
Baumgartner, et al., "Performance of Forward Error Correction for IEEE 802.16e," 10th International OFDM Workshop, Hamburg, Germany, Aug. 2005.
Blestas et al., "Efficient Collaborative (Viral) Communication in OFDM Based WLANs", Proceedings of IEEE/ITS International Symposium on Advanced Radio Technologies (ISART 2003), Institute of Standards and Technology, Boulder Colorado, Mar. 4-7, 2003, pp. 27-32.
Brodersen, et al., "Corvus: a cognitive radio approach for usage of virtual unlicensed spectrum," Online, http://www.tkn.tu-berlin.de/publications/papers/CR_White_paper_final.pdf, 2004.
Čabrić, Danijela et al., *A Cognitive Radio Approach for Usage of Virtual Unlicensed Spectrum*, In Proc. of $14^{th}$ IST Mobile Wireless Communications Summit 2005, Dresden Germany, Jun. 2005, 4 pages unnumbered.
Chiani, et al., "Ultra Wide Bandwidth Communications towards Cognitive Radio," EMC Europe Workshop, http://www-site.deis.unibo.it/Staff/giorgetti/pubblicazioni/Conferences/emc05_mcaggl.pdf, 2005, pp. 114-117, Rome, Italy.
Examiner's First Report dated Aug. 18, 2010 from Australian Patent Application No. 2007333404.
Goeckel, "Coded Modulation With Non-Standard Signal Sets for Wireless OFDM Systems," IEEE, pp. 791-795, 1999.
Goeckel, et al., "On the Design of Multidimentional Signal sets for OFDM Systems," IEEE Transactions on Communications, vol. 50 No. 3, pp. 442-452, Mar. 2002.
International Search Report from corresponding International Application No. PCT/US2007/085556, filed Nov. 27, 2007, Search dated Mar. 26, 2008.
International Search Report from International Application No. PCT/US2007/010020, Search dated Nov. 5, 2007.
International Search Report from International Application No. PCT/US2007/085556, Search dated Mar. 26, 2008.
International Search Report from International Application No. PCT/US2007/011642, Search dated Sep. 28, 2007.
International Search Report from International Application No. PCT/US2007/010021, Search dated Oct. 17, 2007.
Johnsson, "HiperLAN/2—The Broadband Radio Transmission Technology Operating in the 5 GHz Frequency Band," HiperLAN/2 Global Forum, 1999, Version 1.0.
Krenik, et al., "Cognitive Radio Techniques for Wide Area Networks," Annual ACM IEEE Design Automation Conference, Proceedings of the 42nd Annual Conference on Design Automation, 2005, pp. 409-412, San Diego, USA, ISBN:1-59593-058-2.
Lawrey, et al., "Adaptive Frequency Hopping for Multiuser OFDM," Second International Conference on Information, Communications & Signal Processing, ICICS '99, Singapore, Dec. 7-10, 1999.
Li, et al., "Clustered OFDM with Channel Estimation for High Rate Wireless Data," *IEEE*, 1999, pp. 43-50.
Mitola, et al., Abstract from "Cognitive Radio: Making Software Radios More Personal," Personal Communications, IEEE, Aug. 1999, vol. 6, Issue 4, pp. 13-18, Stockholm, Sweden, ISSN: 1070-9916.

(56) References Cited

OTHER PUBLICATIONS

Mitola, III, et al., "Cognitive Radio An Integrated Agent Architecture for Software Defined Radio," *Royal Institute of Technology (KTH)*, Teleinformatics,Electrum 204, SE-164 40 Kista, Sweden, pp. title page through 304.
Okada, et al., "Pre-DFT Combining Space Diversity Assisted COFDM," IEEE Transactions on Vehicular Technology, vol. 50, No. 2, pp. 487-496, Mar. 2001.
Pottie, "Wireless Multiple Access Adaptive Communications Techniques," Online. http//www.ee.ucla.edu/~pottie/papers/encyc1.pdf, 1999.
Sereni et al., "A Software *RADIO OFDM* Transceiver for WLAN Applications," Electronic and Information Engineering Department(DIEI)—University of Perugia—Italy, pp. 1-14, Apr. 2001.
She, et al., "Adaptive Turbo Coded Modulation for OFDM Transmissions," Communication Technology Proceedings, 2003. ICCT 2003., Apr. 9-11, 2003, pp. 1491-1495, vol. 2, Beijing, China.
Tejera et al., "Subchannel Allocation in Multiuser Multiple Output Systems" IEEE Transactions on Information Theory, Jul. 4, 2006, pp. 1-34.
Tewfik, et al., "High Bit Rate Ultra-Wideband OFDM," Global Telecommunications Conference, 2002, GLOBECOM apos;02, IEEE, Nov. 2002, pp. 2260-2264, vol. 3.
Wahlqvist, et al., "A Conceptual Study of OFDM-based Multiple Access Schemes," Telia, Jun. 5, 1996, http://www.es.lth.se/home/oes/pdfs/etsi1.pdf.
Wang, et al., "Complex-Field Coding for OFDM Over Fading Wireless Channels," IEEE Transactions on Information Theory, Mar. 2003, pp. 707-720, vol. 49, No. 3.
Wong, et al., "Multiuser OFDM with Adaptive Subcarrier, Bit, and Power Allocation," *IEEE Journal on Selected Areas in Communications*, vol. 17, No. 10, Oct. 1999, pp. 1747-1758.
Written Opinion from International Application No. PCT/US2007/010020, Search dated Nov. 5, 2007.
Written Opinion from International Application No. PCT/US2007/011642, Search dated Sep. 28, 2007.
Written Opinion from International Application No. PCT/US2007/085556, Search dated Mar. 26, 2008.
Written Opinion from International Application PCT/US2007/010021, Search dated Oct. 17, 2007.
Youngblood, "A Software-Defined Radio for the Masses, Part 1," http://www.ece.jbu.edu/~cooper/SWRadio/Yblood1.pdf, Jul./Aug. 2002, pp. 1-9.
Zhang, Qiwei et al., *Adaptive OFDM System Design for Cognitive Radio*, In: 11[th]International OFDM-Workshop, Aug. 30-31, 2006, Hamburg, Germany, pp. 91-95, IEEE Communications Society.
CN Notice on Reexamination for Application No. 200780045500.5, dated May 4, 2015.
AU Examiner's First Report for Application No. 2007 333 404, dated Aug. 18, 2010.
JP Notification of Reason for Rejection for Application No. 2010-544299, dated Apr. 18, 2013.
EP Communication for Application No. 08747424.3-1505, dated Apr. 10, 2013.
EP Communication for Application No. 07777062.6-1854 / 2018718 PCT/US2007011642, dated Mar. 8, 2013.
CN Notice on the Second Office Action for Application No. 200880125896.9, dated Dec. 19, 2012.
CN Decision on Rejection for Application No. 200780045500.5, dated Feb. 5, 2013.
CN Notice on the Second Office Action for Application No. 200780045500.5, dated Nov. 9, 2012.
CN Notice on the Second Office Action for Application No. 200780016912.6, dated Jan. 7, 2013.
Cabric, Danijela et al., "A Cognitive Radio Approach for Usage of Virtual Unlicensed Spectrum", pp. 1-4, 1st Mobile Summit 2005, Jun. 2005.
CN Notice on Reexamination for Application No. 200780045500.5, dated Dec. 26, 2014.

Japanese Application 2009-541463, Notice of Rejection, dated Oct. 19, 2012.
Rhee, W. et al.; "Increase in Capacity of Multiuser OFDM System Using Dynamic Subchannel Allocation", VTC 2000-Spring; 2000 IEEE 51st Vehicular Technology Conference Proceedings; Tokyo Japan, May 15-18, 2000, IEEE Vehicular Technology Conference, New York, NY: IEEE, US, vol. Conf. 51, May 15, 2000 (May 15, 2000), pp. 1085-1089, XP000968037; DOI: 10.1109/Vetecs.2000. 851292; ISBN: 978-0-7803-5719-8.
EPO Application 08747424.3; Extended European Search Report; dated Aug. 22, 2012.
Office Action from Chinese Patent Application No. 200780045500.5 dated Jan. 31, 2012.
MY Substantive Examination Adverse Report for Application No. PI 20092035, dated May 29, 2015.
EP Communication for Application No. 08871573.5-1851, dated Nov. 12, 2015.
CN Notice on the Third Office Action for Application No. 200880125896.9, dated Jan. 22, 2016.
Chinese Patent Office, Author unknown, CN Notice on Grant of Patent Right for Invention for Application No. 200880125896.9, pp. 1-2, dated Jul. 26, 2016, China.
Chinese State Intellectual Property Office, Author unknown, CN Notice on Grant of Patent Right for Invention for Application No. 200880015382.8, pp. 1-2, dated Sep. 28, 2014, China.
Indian Patent Office, Author unknown, in Second Examination Report for Application No. 5117/CHENP/2008, 2 pages, dated Dec. 19, 2016, India.
U.S. Appl. No. 15/189,692, filed Jun. 22, 2016, Hassan.
Indian Patent Office, Author unknown, IN First Examination Report for Application No. 4040/CHENP/2009, dated Jul. 3, 2017, 9 pages, India.
Indian Patent Office, Author unknown, IN Notice of Allowance for Application No. 5117/CHENP/2008, dated Mar. 24, 2017, 2 pages, India.
Indian Patent Office, Author unknown, IN Hearing Notice in Reference of Application No. 5118/CHENP/2008, dated May 17, 2017, 1 page, India.
Chinese State Intellectual Property Office, Author unknown, CN Notice on Reexamination for Application No. 200880125896.9, dated Jul. 3, 2015, 14 pages, China.
Federal Service for Intellectual Property, Patents and Trademarks (Russian Federation), Attorney Yury D. Kuznetsov, RU Decision on Grant of a Patent for Invention for Application No. 2008142422, dated Mar. 23, 2011, 16 pages, Russia.
Chinese State Intellectual Property Office, Author unknown, CN Decision on Reexamination for Application No. 200880125896.9, dated Sep. 29, 2015, 15 pages, China.
Sari, "Orthogonal Frequency-Division Multiple Access and its Application to CATV Networks", European Transactions on Telecommunications, Communication Theory, vol. 9, No. 6, Nov.-Dec. 1998, pp. 507-516, France.
Chinese State Intellectual Property Office, Author unknown, CN Decision on Reexamination for Application No. 200780015143.8, dated Mar. 28, 2013, 9 pages, China.
Indian Patent Office, Author unknown, IN First Examination Report for Application No. 5117/CHENP/2008, dated Feb. 26, 2016, 2 pages, India.
Indian Patent Office, Author unknown, IN First Examination Report for Application No. 5118/CHENP/2008, dated Oct. 16, 2015, 2 pages, India.
Norwegian Patent Office, Report by Abraham Ghebremedhin, NO Search Report for Application No. 20092613, dated Feb. 10, 2017, 5 pages, Norway.
Otani, "Subcarrier Allocation for multi-user OFDM system", 2005 Asia-Pacific Conference on Communications, Oct. 3-5, 2005, pp. 1073-1077, Perth, Western Australia.
"Decision on Grant Issued in Russian Patent Application No. 2009126590", dated Mar. 30, 2012, 15 Pages.
"Office Action Issued in Norway Patent Application No. 20092613", dated Nov. 2, 2017, 3 Pages.
"Final Office Action Issued in U.S. Appl. No. 11/637,449", dated Apr. 12, 2010, 19 Pages.

(56) References Cited

OTHER PUBLICATIONS

"Non Final Office Action Issued in U.S. Appl. No. 11/637,449", dated Sep. 15, 2010, 17 Pages.
"Non Final Office Action Issued in U.S. Appl. No. 11/637,449", dated May 27, 2011, 6 Pages.
"Non Final Office Action Issued in U.S. Appl. No. 11/637,449", dated Sep. 25, 2009, 14 Pages.
"Non Final Office Action Issued in U.S. Appl. No. 13/427,494", dated Apr. 25, 2014, 12 Pages.
"Final Office Action Issued in U.S. Appl. No. 14/656,694", dated Nov. 17, 2016, 10 Pages.
"Non Final Office Action Issued in U.S. Appl. No. 14/656,694", dated Feb. 10, 2017, 10 Pages.
"Non Final Office Action Issued in U.S. Appl. No. 14/656,694", dated Aug. 4, 2016, 13 Pages.
"Non Final Office Action Issued in U.S. Appl. No. 15/411,806", dated May 12, 2017, 5 Pages.
"Office Action Issued in Mexican Patent Application No. MX/a/2009/006317", dated Mar. 9, 2011, 3 Pages.
"Final Office Action Issued in U.S. Appl. No. 14/562,470", dated Jul. 22, 2015, 10 Pages.
"Non Final Office action Issued in U.S. Appl. No. 15/053,353", dated Oct. 24, 2016, 11 Pages.
"Non-Final Office Action Issued in U.S. Appl. No. 15/156,676", dated Nov. 18, 2016, 10 Pages.
"Final Office Action Issued in U.S. Appl. No. 15/189,603", dated Jun. 29, 2018, 29 Pages.
"Non Final Office Action Issued in U.S. Appl. No. 15/189,603", dated Jun. 22, 2017, 33 Pages.
"Non-Final Office Action Issued in U.S. Appl. No. 15/189,603", dated Feb. 5, 2018, 31 Pages.
"Final Office Action Issued in U.S. Appl. No. 15/189,603", dated Oct. 6, 2017, 38 Pages.
"Non Final Office action Issued in U.S. Appl. No. 15/683,694", dated May 3, 2018, 9 Pages.
"Office Action Issued in Russian Patent Application No. 2008142379", dated Feb. 16, 2011, 7 Pages.
"Office Action Issued in Russian Patent Application No. 2008142422", dated Jan. 24, 2011, 9 Pages.
"Office Action Issued in Russian Patent Application No. 2008144587", dated Apr. 7, 2011, 10 Pages.
"Office Action Issued in Russian Patent Application No. 2008144587", dated Dec. 10, 2010, 7 Pages.
"Office Action Issued in Norway Patent Application No. 20092613", dated Mar. 19, 2018, 2 Pages.
"Office Action Issued in Indian Patent Application No. 04879/DELNP/2010", dated Sep. 29, 2017, 5 Pages.
"Office Action Issued in Mexican Patent Application No. MX/a/2008/013326", dated Jun. 22, 2010, 4 Pages.
"Office Action Issued in Mexican Patent Application No. MX/a/2008/013648", dated Apr. 7, 2011, 7 Pages.
"Office Action Issued in Mexican Patent Application No. MX/a/2008/014240", dated Mar. 10, 2011, 6 Pages.
"Second Office Action Issued in Mexican Application No. MX/a/2008/014240", dated May 2, 2012, 7 Pages.
"Office Action Issued in Indian Patent Application No. 04040/CHENP/2009", dated May 3, 2018, 2 Pages.
"Office Action Issued in Indian Patent Application No. 06090/CHENP/2009", dated Aug. 23, 2017, 6 Pages.
"Supplementry Search Report Issued in European Patent Application No. 08837680.1", dated Jun. 13, 2012, 7 Pages.
"Office Action Issued in European Application No. 08871573.5", dated Feb. 16, 2018, 6 Pages.
"Office Action Issued in European Patent Application No. 09713253.4", dated Jul. 4, 2018, 5 Pages.
"Non Final Office action Issued in U.S. Appl. No. 11/410,409", dated Jan. 22, 2009, 9 Pages.
"Final Office Action Issued in U.S. Appl. No. 11/410,969", dated Aug. 5, 2009, 8 Pages.
"Final Office Action Issued in U.S. Appl. No. 11/410,969", dated Aug. 17, 2010, 7 Pages.
"Non Final Office action Issued in U.S. Appl. No. 11/410,969", dated Feb. 3, 2009, 12 Pages.
"Non Final Office action Issued in U.S. Appl. No. 11/410,969", dated Oct. 22, 2009, 9 Pages.
"Non Final Office action Issued in U.S. Appl. No. 11/410,969", dated Apr. 22, 2010, 6 Pages.
"Final Office Action Issued in U.S. Appl. No. 11/433,804", dated Apr. 16, 2009, 23 Pages.
"Final Office Action Issued in U.S. Appl. No. 11/433,804", dated Sep. 17, 2010, 37 Pages.
"Non Final Office Action Issued in U.S. Appl. No. 11/433,804", dated May 23, 2011, 39 Pages.
"Non Final Office Action Issued in U.S. Appl. No. 11/433,804", dated Sep. 22, 2009, 30 Pages.
"Non Final Office Action Issued in U.S. Appl. No. 11/433,804", dated Mar. 25, 2010, 33 Pages.
"Non Final Office Action Issued in U.S. Appl. No. 11/433,804", dated Nov. 13, 2008, 18 Pages.
"Final Office Action Issued in U.S. Appl. No. 11/434,393", dated Jun. 30, 2011, 23 Pages.
"Final Office Action Issued in U.S. Appl. No. 11/434,393", dated Sep. 2, 2010, 22 Pages.
"Non-Final Office Action Issued in U.S. Appl. No. 11/434,393", dated Apr. 13, 2010, 21 Pages.
"Non-Final Office Action Issued in U.S. Appl. No. 11/434,393", dated Jan. 21, 2011, 23 Pages.
"Non-Final Office Action Issued in U.S. Appl. No. 11/434,393", dated Oct. 5, 2009, 15 Pages.
"Non-Final Office Action Issued in U.S. Appl. No. 11/434,393", dated Dec. 10, 2008, 15 Pages.
"Final Office Action Issued in U.S. Appl. No. 11/434,393", dated Apr. 28, 2009, 20 Pages.
"Final Office Action Issued in U.S. Appl. No. 11/731,269", dated Jun. 30, 2010, 10 Pages.
"Non Final Office action Issued in U.S. Appl. No. 11/731,269", dated Jan. 7, 2010, 10 Pages.
"Non-Final Office Action Issued in U.S. Appl. No. 11/899,248", dated Oct. 27, 2010, 8 Pages.
"Final Office Action Issued in U.S. Appl. No. 12/020,212", dated Jul. 1, 2011, 32 Pages.
"Non-Final Office Action Issued in U.S. Appl. No. 12/020,212", dated Mar. 2, 2011, 27 Pages.
"Non Final Office action Issued in U.S. Appl. No. 13/052,667", dated Nov. 22, 2011, 9 Pages.
"Non-Final Office Action Issued in U.S. Appl. No. 13/153,801", dated Aug. 23, 2012, 6 Pages.
"Non-Final Office Action Issued in U.S. Appl. No. 13/153,801", dated Jun. 6, 2013, 4 Pages.
"Final Office Action Issued in U.S. Appl. No. 13/250,655", dated Feb. 24, 2015, 6 Pages.
"Final Office Action Issued in U.S. Appl. No. 13/250,655", dated Jan. 11, 2016, 7 Pages.
"Non Final Office Action Issued in U.S. Appl. No. 13/452,637", dated Sep. 17, 2012, 17 Pages.
"Final Office Action Issued in U.S. Appl. No. 13/763,671", dated Jul. 9, 2015, 15 Pages.
"Non Final Office Action Issued in U.S. Appl. No. 13/763,671", dated Mar. 5, 2015, 18 Pages.
"Final Office Action Issued in U.S. Appl. No. 14/104,027", dated Aug. 20, 2015, 14 Pages.
"Non-Final Office Action Issued in U.S. Appl. No. 14/104,027", dated Apr. 13, 2015, 12 Pages.
"Final Office Action Issued in U.S. Appl. No. 14/256,709", dated Jun. 23, 2015, 10 Pages.
"Non Final Office action Issued in U.S. Appl. No. 14/256,709", dated Jan. 9, 2015, 9 Pages.
"Non-Final Office Action Issued in U.S. Appl. No. 14/256,709", dated Sep. 3, 2015, 12 Pages.
"Final Office Action Issued in U.S. Appl. No. 14/446,323", dated Feb. 13, 2017, 23 Pages.

(56) References Cited

OTHER PUBLICATIONS

"Final Office Action Issued in U.S. Appl. No. 14/446,323", dated Mar. 29, 2018, 24 Pages.
"Final Office action Issued in U.S. Appl. No. 14/446,323", dated May 16, 2016, 20 Pages.
"Non Final Office action Issued in U.S. Appl. No. 14/446,323", dated Nov. 23, 2015, 22 Pages.
"Final Office action Issued in U.S. Appl. No. 14/446,323", dated Sep. 8, 2016, 23 Pages.
"Non Final Office action Issued in U.S. Appl. No. 14/446,323", dated Sep. 20, 2017, 25 Pages.
"Non Final Office Action Issued in U.S. Appl. No. 14/562,470", dated May 12, 2015, 42 Pages.
"Non-Final Office Action Issued in U.S. Appl. No. 14/562,470", dated Feb. 19, 2016, 30 Pages.
"Office Action Issued in Brazilian Patent Application No. PI0719026-3", dated Jul. 17, 2019, 5 Pages.
Norwegian Intellectual Property Office, Author Arlindo Bengui André, NO Search Report for Application No. 20084086, 2 Pages, Feb. 4, 2017, Norway.

* cited by examiner

COGNITIVE MULTI-USER OFDMA

RELATED APPLICATIONS

This Application is a Continuation of, and claims benefit from, U.S. patent application Ser. No. 13/427,494 filed in Mar. 22, 2012, and that is a Continuation of patent application Ser. No. 11/637,449, (U.S. Pat. No. 8,144,793), that was filed on Dec. 12, 2006, (Issued Mar. 27, 2012) each of which is incorporated herein by reference in its entirety.

BACKGROUND OF THE INVENTION

Wireless connections between computing devices have become increasingly common as computing devices have become more mobile. As a result, wireless connections are now used in a variety of ways. For example, wireless communication allows computing devices to connect to hard-wired networks though access points so that devices brought within range of the access point can access network resources, such as servers and printers. Wireless communication also allows computing devices to connect to other computing devices on an ad hoc basis so that the devices may exchange data without any fixed infrastructure.

To establish a wireless connection between two computing devices, a portion of a frequency spectrum is used to carry radio frequency signals between the devices according to a wireless communication protocol. Many wireless communication protocols divide an available frequency spectrum into multiple channels such that multiple computing devices may transmit data at the same time and minimize interference with each other.

Orthogonal Frequency Division Multiplexing (OFDM) is one communication protocol, used in both wireless and wired networks, in which a frequency spectrum is divided into multiple channels. In OFDM, channels are further divided into usually equal sub-channels, each with a relatively narrow bandwidth. By using sub-channels of narrow bandwidth, communications are less susceptible to detrimental multipath fading or other electromagnetic interference and the risk of narrow band interference between nearby devices communicating through wireless connections is reduced, which can lead to higher data rates or improved error rate performance of data transmitted over a channel.

SUMMARY OF THE INVENTION

Wireless and wired communication between computing devices is improved by using a set of selected sub-channels. The sub-channels may be selected from anywhere in a frequency spectrum usable by the computing devices for communication.

Sub-channels may be selected based on measurements of the characteristics of those sub-channels. To improve the efficiency with which the sub-channels are selected, cognitive process may be used. A cognitive process according to the invention may be applied in a mobile computing, device to prolong the operating time available from a battery or other limited power source.

A cognitive process may base the selection of sub-channels on current measurement of sub-channel characteristics and previously obtained information. Information used for cognitive processing may include information about sub-channels previously selected to establish a connection, whether by the same computing device or another computing device. Such information may also include information about sub-channels previously determined to be unsuitable for use in establishing a channel.

In one illustrative embodiment of the invention, a subset of suitable sub-channels is selected from a set of sub-channels, wherein the subset is selected from anywhere in the set and the sub-channels are not restricted to being contiguous. Sub-channel suitability may be determined by any suitable technique, including examining the sub-channel for signals generated by another computing device or for high levels of electromagnetic interference from other sources. Techniques are also employed for selection of sub-channels to be examined, which may also be done in any suitable manner, including maintaining a list of previously-used sub-channels to be examined first, sequentially scanning through a list of sub-channels, and randomly selecting sub-channels.

In a further illustrative embodiment, a method of operating a computing device for communication using a (FDM) Frequency Division Multiplexing protocol is provided. The method comprises: selecting a first plurality of selected sub-channels to carry a signal having a first bandwidth, the first plurality being selected from a second plurality of sub-channels, the second plurality collectively having a second bandwidth, the second bandwidth greater than the first bandwidth; and communicating the signal using the first plurality of selected sub-channels.

In another illustrative embodiment, a computer apparatus comprising at least one computer readable medium encoded with instructions for execution on a computer is provided. The instructions, when executed, perform a method comprising: determining a set of usable sub-channels in a first plurality of sub-channels; selecting a second plurality of selected sub-channels, the selected sub-channels being selected from the set of usable sub-channels, the second plurality being less than the first plurality; and communicating the signal over the second plurality of selected sub-channels.

In one illustrative embodiment, a method of communicating between a first computing device and a second computing device is provided. The method comprises: with the first computing device, selecting a plurality of selected sub-channels to carry a signal having a first bandwidth, the selected sub-channels being selected from a plurality of sub-channels, the plurality of sub-channels collectively having a second bandwidth, the second bandwidth greater than the first bandwidth; and transmitting at least one message over the plurality of selected sub-channels.

DETAILED DESCRIPTION

Applicants have appreciated that both wireless and wired communication between computing devices may be improved by forming channels from sub-channels of a frequency spectrum without regard to whether the sub-channels are contiguous or non-contiguous.

Conventional implementations of Orthogonal Frequency Division Multiplexing (OFDM) use only contiguous sub-channels within a given range of frequencies to carry a transmitted signal. If that signal is subject to electronic interference or there are many devices using that same range of frequencies to communicate, many of the sub-channels intended to carry the signal may be unsuitable for communication. Because a computing device is restricted in which sub-channels can be used to carry a signal, the resulting signal may not support communication at a desired data rate and the computing devices may have to lower the data rate of transmissions over a channel when spectrum conditions are not ideal.

By selecting sub-channels from any portion of the spectrum available for communication between computing devices, contiguous or non-contiguous, to construct a signal for use by the computing device, transmission may be achieved at higher data rates regardless of spectrum conditions.

Sub-channels may be efficiently selected using a cognitive process. By learning which sub-channels are suitable or unsuitable for use, the time and processing cost of selection processes may be reduced. In some embodiments, the cognitive process is used within a mobile computing device operating from a battery or other limited power source. Reducing processing cost results in a decreased power drain, which prolongs operating time of the device until the batteries must be replaced or recharged. The user's experience may thus be improved by providing communication at faster data rates without an unacceptable power drain.

Figure 1:
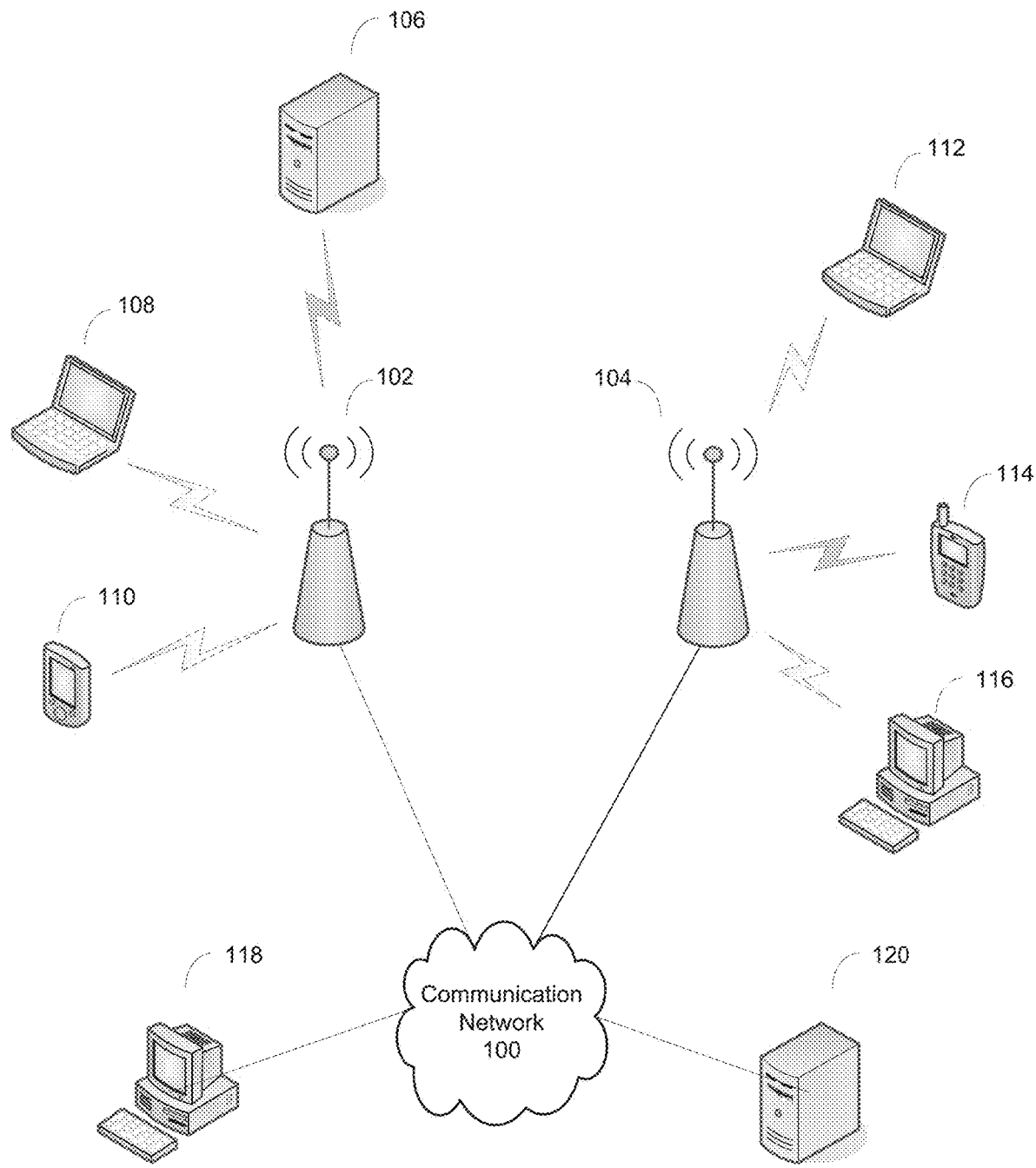
FIG. 1 is a diagram of an illustrative computer system environment in which embodiments of the invention may be implemented.

In view of the foregoing, one embodiment of the present invention is directed to a cognitive process for choosing suitable sub-channels of an FDM protocol. Such a process may be implemented on any of numerous computer system configurations, which are not limited to any particular type of configuration. FIG. 1 illustrates one example of a computer system on which aspects of the invention can be implemented, although others are possible.

The computer system of FIG. 1 includes communication network 100, wireless access points 102 and 104, wireless computing devices 106, 108, 110, 112, 114, and 116, and wired computing devices 118 and 120. Communication network 100 can be any suitable communication medium or media for exchanging data between two or more computers (e.g., a server and a client), including the Internet or an enterprise network. The wireless computing devices can be any suitable computing devices with wireless communication capabilities. Several exemplary wireless computing devices are shown, including laptops 108 and 112, personal digital assistant 110, and smart phone 114. In addition, typically stationary devices can be enabled for wireless communication, such as server 106 and computer terminal 116. Each of these mobile and stationary devices is in a state of, or capable of being in a state of, wireless communication with a wireless access points 102 or 104, each connected to communication network 100. This wireless communication allows the computing devices to exchange data with one another or, through communication network 100, with wired devices such as computer terminal 118 and server 120. As each wireless device transmits data to access point 102/104 or to another device, it may use one or more sub-channels of the available spectrum. Thus, the wireless devices may compete with one another for access to "suitable" sub-channels. The suitability of a sub-channel may be determined based on whether it is being subjected to too much interference to permit effective communication. This interference may comprise noise generated by another computing device transmitting data or any other electric noise, such as may be generated by any electronic device operating within range of the exemplary computing system shown in FIG. 1.

The embodiments of the invention described herein are not limited to being practiced with the exemplary system shown in FIG. 1, and can be employed on systems employing any number of wireless access points and/or computing devices. In addition, while FIG. 1 shows the computing devices in wireless communication with wireless access points 102 and 104 in an infrastructure network, it should be appreciated that embodiments of the invention may operate in ad hoc or other networks in which the computing devices communicate with one another directly and not through an access point. Also, while FIG. 1 includes communication network 100 with wired devices 114 and 116, embodiments of the invention may not include a wired network.

In addition, it should be appreciated that the invention is not limited to being performed in the exemplary wireless network shown in FIG. 1. Embodiments of the invention may be implemented in any suitable communication network—including wired networks—for exchanging data between computing devices in which frequency division multiplexing is implemented.

Figure 2:
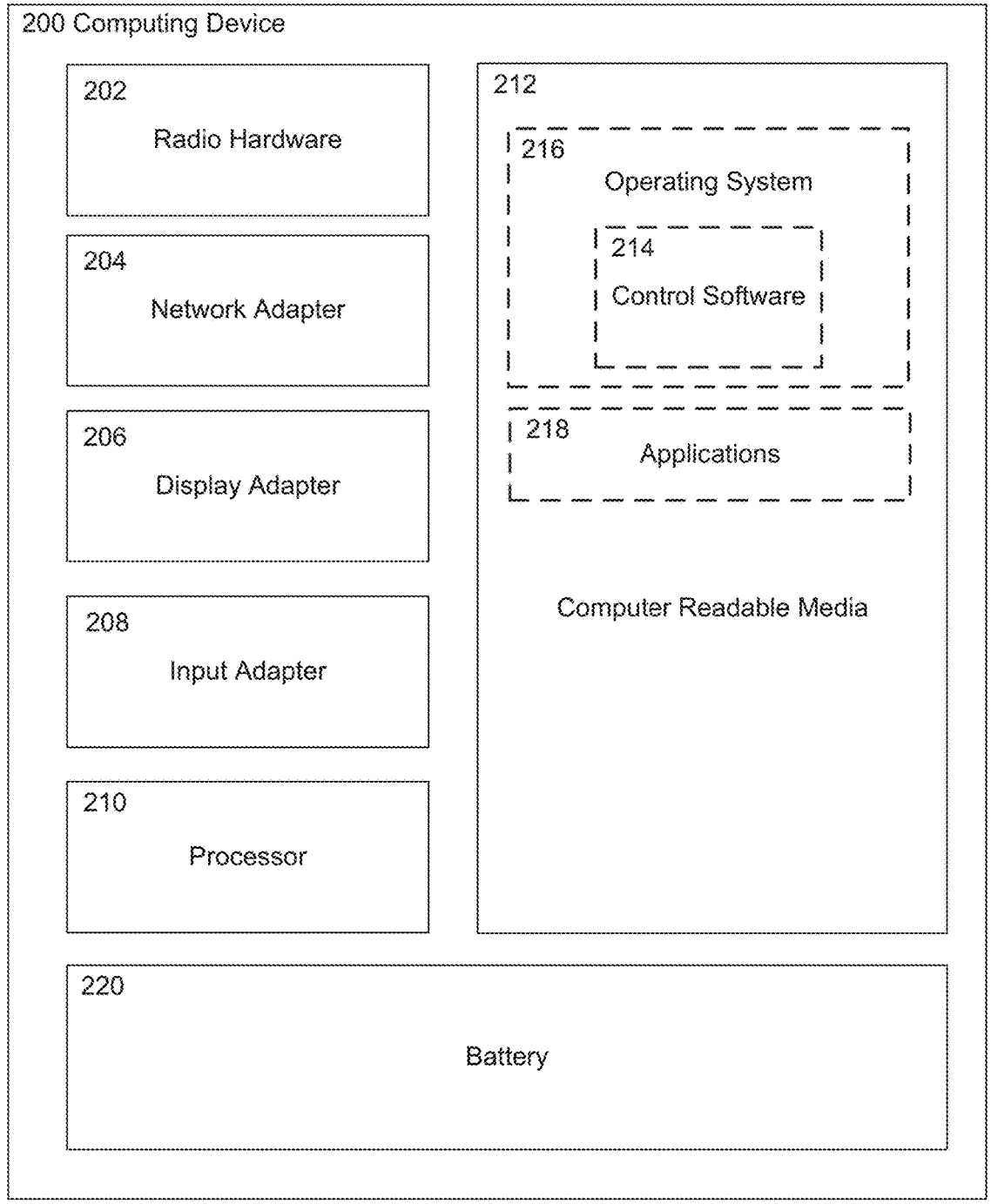
FIG. 2 is a block diagram of an exemplary client computer that may be used in accordance with embodiments of the invention.

FIG. 2 schematically shows an illustrative computing device 200 that may be used in accordance with one or more embodiments of the invention. Computing device 200 may be any of the computing devices shown above, such as devices 106, 108, 110, 112, 114, and 116, or wireless access points 102 and 104. It should be appreciated that FIG. 2 is intended to be neither a depiction of necessary components for a computing device to operate with embodiments of the invention nor a comprehensive depiction.

Computing device 200 comprises a wireless interface, which may serve as a wireless network interface. In the embodiment illustrated, the wireless network interface may be implemented with radio hardware 202 to communicate wirelessly, such as with a wireless access point or with other devices. Device 200 also comprises a network adapter 204 to communicate over a computer network using other (possibly non-wireless) methods, a display adapter 206 to display information to a user of the device, and an input adapter 208 to receive commands from the user. In some embodiments of the invention, computing device 200 may also comprise a battery 220.

Device 200 further comprises computer-readable media 212 for storing data to be processed and/or instructions to be executed by a processor 210. Processor 210 enables processing of data and execution of instructions. The data and the instructions may be stored on the computer-readable media 212 and, for example, may enable communication between components of the computing device 200. The data and instructions may comprise an operating system 216, which may in turn comprise control software 214. Control software 214 may comprise computer-executable instructions that control transmitting and receiving data wirelessly using any suitable protocol including OFDM protocols. Computer-readable media 212 may further have stored thereon computer-executable instructions comprising applications 218 for execution on computing device 200. Applications 218 may, for example, be used by a user of the computing device to use components of the computing device to carry out various functions and complete desired operations.

It should be appreciated that the invention is not limited to being practiced with the type of computing device illustrated in FIG. 2, and that embodiments of the invention can be practiced with any suitable computing device. The radio hardware 202 and adapters 204, 206, and 208 may be implemented as any suitable hardware, software, or combination thereof, and may be implemented as a single unit or multiple units. Similarly, computer-readable media 212 may be implemented as any medium or combination of media for storing data and instructions for access by a processing device.

In some embodiments of the invention, multiple computing devices such as computing device 200 may transmit data over a limited number of sub-channels, Computing devices may, therefore, select sub-channels that are suitable for communication. This selection may be done in any manner, examples of which are discussed in further detail below. Once a computing device has selected a sub-channel or sub-channels for transmission, the device may "reserve" these sub-channels for its use in transmitting data, to prevent other computing devices from transmitting data over the sub-channel and thereby interfering with communication. In some embodiments, the sub-channels may be reserved for the computing device for a single, discrete data transfer, and thus the sub-channel selection and reservation process may be repeated every time a data transfer is to be made. In alternative embodiments, the sub-channels may be reserved by the computing device for multiple discrete data transfers comprising a communication session, and the sub-channel selection and reservation process repeated at the start of every session. In some embodiments, the selection process may also be executed during a data transfer or during a communication session, for example, if a higher data rate is desired and thus more sub-channels are needed or if one or more sub-channels become unsuitable for communication during a data transfer or session. It should be appreciated that the invention is not limited to performing the selection process at a set time or under set conditions, as the selection and reservation of sub-channels may be done in any suitable manner at any suitable time in the communication process.

Once the computing device is finished communicating data over the sub-channels, the selected sub-channels that had been previously reserved for communication by the device may be released by the device so that other devices may make use of them. This release may happen at the end of a single data transfer, or at the end of a communication session. In some embodiments, this release may also be executed during a data transfer or communication session if the computing device desires a lower data rate. A lower data rate may be desired, for example, if a receiving device indicates that the data is being transmitted at too high a data rate for the receiving device to process the data appropriately.

Figure 3:
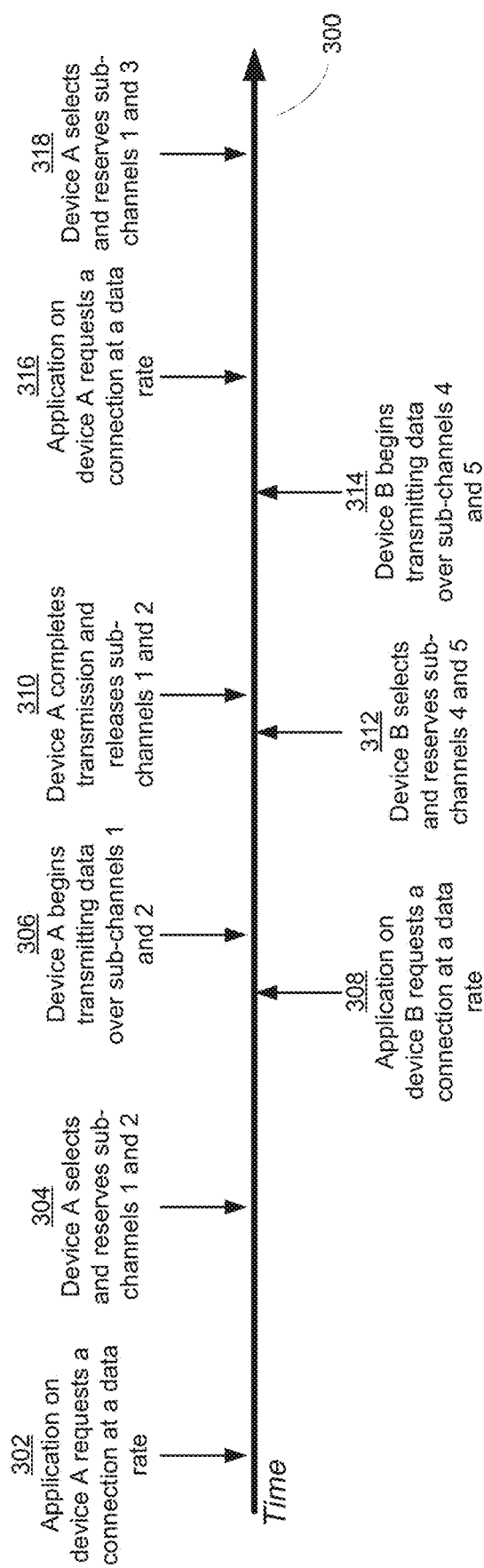
FIG. 3 is a timeline of an exemplary process by which computing devices select sub-channels and communicate data over the sub-channels.

FIG. 3 illustrates this process with an overview of an exemplary communication process with multiple computing devices on a timeline 300. Details of the process are discussed below, as FIG. 3 is intended merely to be an overview presented for ease of explanation.

In act 302, an application on a device A requests a connection at a desired data rate. It is then determined that to transmit data at the desired rate, two sub-channels are necessary, and the spectrum is examined for two suitable sub-channels. In act 304, device A selects two suitable sub-channels 1 and 2 from the spectrum and reserves them for its use. It may also, in some embodiments, store an indication that these two sub-channels were selected for use.

In act 306, an application on device B requests a connection at a certain data rate, and it is again determined that two sub-channels are necessary to achieve this desired rate. While device A begins transmitting data in act 306, device B is examining the spectrum and identifies sub-channels 4 and 5 as suitable for communication. In act 312 device B selects and reserves these sub-channels for communication. In some embodiments of the invention, device B may have received a notification message from device A indicating that sub-channels 1 and 2 had been reserved by device A for communication, and in some embodiments device B may have detected device A's transmission on those sub-channels and identified them as unsuitable because they were being used. In act 310, device A completes its transmission of data and releases the sub-channels, making them suitable for communication by any devices in the network, and in act 314, device B begins transmitting data over sub-channels 4 and 5.

In act 316, an application on device A requests a connection be established at a certain data rate, and it is again determined that transmission of data at that rate requires two sub-channels. Device A begins examining the spectrum for suitable sub-channels, determines that sub-channels 1 and 3 are suitable, and in act 318 selects and reserves sub-channels 1 and 3. In some embodiments of the invention, device A may have examined sub-channels 1 and 2 prior to examining sub-channel 3 because it had previously selected these sub-channels as suitable for transmission. Device A may have determined during its examination that sub-channel 2 was no longer suitable for transmission because of interference—from another computing device transmitting data over the sub-channel or from any other electronic noise—and therefore examined and selected sub-channel 3. In alternative embodiments, sub-channels 1 and 3 may have been randomly examined for suitability and subsequently selected. It should be appreciated that embodiments of the invention are not limited to selecting sub-channels according to any specific technique or techniques, as sub-channel selection may be implemented in any suitable manner.

Figure 4:
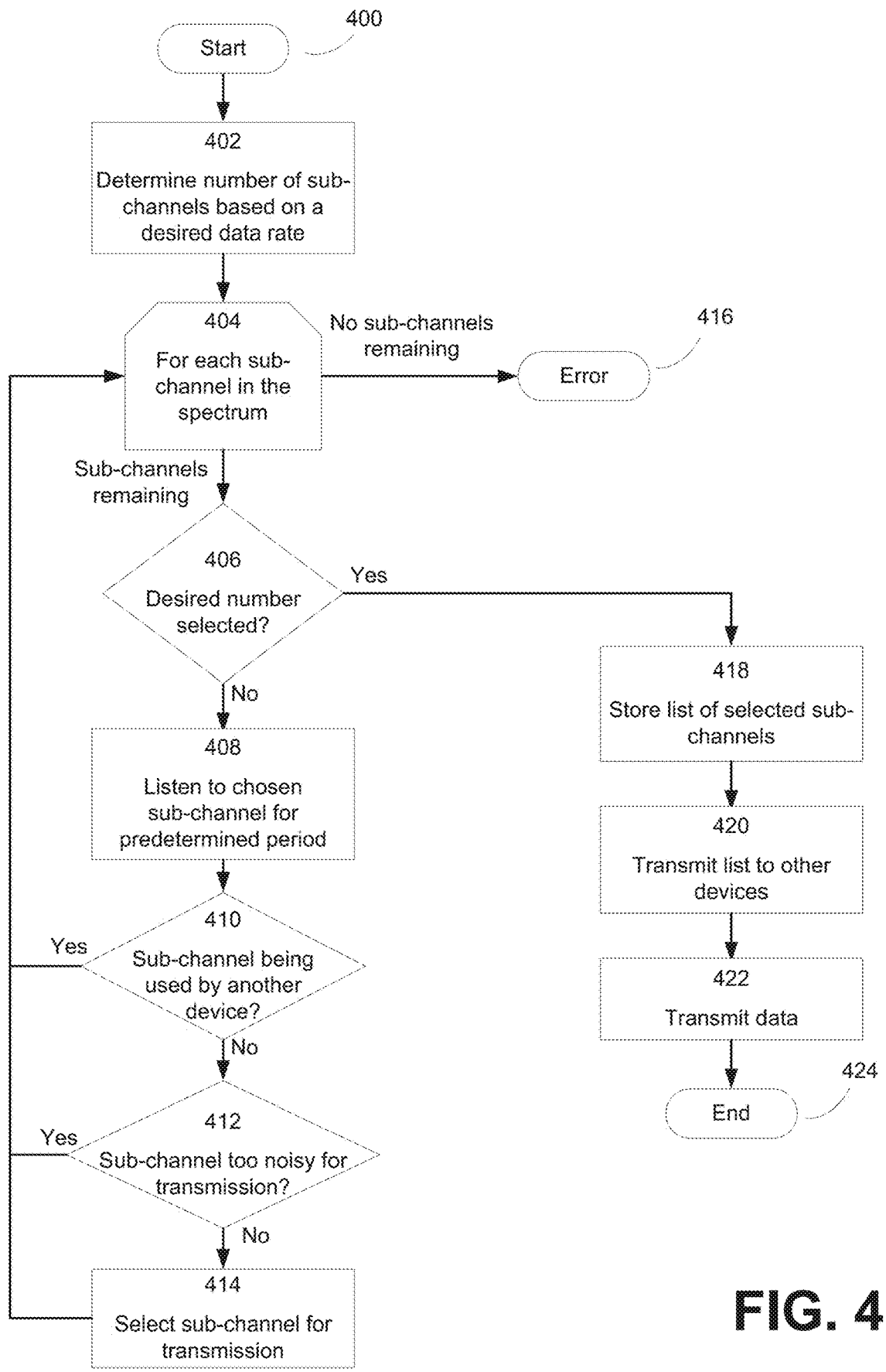
FIG. 4 is a flowchart of an illustrative process of selecting sub-channels for communication.

FIG. 4 illustrates one exemplary sub-channel selection process implemented by a computing device to select sub-channels for communicating data wirelessly according to some embodiments of the invention. The process of FIG. 4 could be implemented as computer-executable instructions stored on at least one computer-readable medium such as computer-readable media 212, or may be implemented in any other suitable manner. It should also be appreciated that sub-channels may be selected for transmission in any suitable manner, and that embodiments of the invention are not limited to being performed with the exemplary process shown in FIG. 4.

The process of FIG. 4 begins in act 400, wherein initialization acts are performed. Initialization acts may include an application executing on the computing device requesting a connection at a data rate be established between the computing device and another computing device, a determination of various options for the connection being made, and/or a determination of what data is to be transmitted to the other computing device being made. Once the initialization acts are performed, the process continues to act 402, wherein a determination is made of a number of sub-channels based on a desired rate.

Sub-channels may be selected in any suitable way. For example, in the illustrative embodiment of FIG. 4, to select sub-channels the process executes a loop beginning in act 404. The loop comprises examining sub-channels in a spectrum available for use by the device for communication to determine which sub-channels are suitable for communication. Both the ordering of sub-channels for examination and the examination may be done in any suitable manner, examples of which are discussed below.

The loop of the illustrative process of FIG. 4 has two possible end conditions. In the first possible end condition, the loop may examine all sub-channels in the spectrum before finding a desired number of sub-channels, at which point the process continues to act 416. If processing reaches act 416, an error has occurred, which can be handled by the application requesting the connection or in any other suitable way. In some embodiments, processing at act 416 may include reporting to the application a data rate that can be supported by suitable sub-channels and the process of FIG. 4 may be re-initialized by the application lowering the desired data rate to the highest rate allowed by the suitable sub-channels. In other embodiments processing to select sub-channels may wait a predetermined or random period of time before re-examining the spectrum for suitable sub-channels. Alternatively, in the second possible end condition, processing in act 406 determines that a desired number of sub-channels has been selected, at which point the process continues to act 418. Act 418 and subsequent acts are discussed in greater detail below.

Until an end condition is met, the process of FIG. 4 loops through the sub-channels of the spectrum. In act 408, a chosen sub-channel is examined to collect information to aid in the determination made at acts 410 and 412. In act 410, the process determines whether the sub-channel is being used by another device for communication and, in act 412, determines whether the sub-channel is being subjected to too much electronic interference to permit effective communication. In the embodiment illustrated, a sub-channel is deemed unsuitable for use in communicating a signal if the sub-channel is already in use by another device or is otherwise too noisy. If in either of the acts the sub-channel is determined to be unsuitable for communication, then the loop continues with the next sub-channel. If it is determined to be suitable for communication, however, then it is selected (in act 414) for transmission and the loop is continued with the next sub-channel.

It should be appreciated that information may be obtained at act 408 in any suitable manner. In the illustrated process, information is obtained by monitoring enemy in the sub-channel over a predetermined interval as one form of "listening" on the sub-channel. In some embodiments, the computing device will tune its hardware to the sub-channel being examined and use a receiver in the hardware to collect data on the enemy in that sub-channel for a predetermined period of time. Data may be collected in any suitable form, including peak energy levels, average energy levels, median energy levels, etc. In this embodiment, listening may comprise detecting energy levels on the sub-channel to provide as input to the acts of determination, or may comprise receiving (or attempting to receive) data from the sub-channel. In other embodiments, the computing device may sample the entire spectrum at least once, and, through performing examination steps such as a Fourier Transform on the sample, determine energy levels present in multiple sub-channels. It should be appreciated, however, that these techniques are merely exemplary, and any suitable technique for examining a sub-channel or sub-channels may be used in accordance with embodiments of the invention.

If a desired number of sub-channels is selected from the spectrum (the second end condition discussed above), then the process branches from act 406 to act 418, where an indication of the selected sub-channels is stored on the computing device. The indication may be formatted as a list or as any other suitable data structure. The list (for example) could be stored in temporary storage on the computing device for use in transmission, or could be stored in long-term storage for use in future transmissions.

In act 420, the computing device transmits a notification message comprising the list of sub-channels to one or more other computing devices. In some embodiments of the invention, this notification message may serve to reserve the selected sub-channels for use by the computing device until the sub-channels are later released by the computing device. The other computing devices may comprise another computing device acting as another end point of the connection that is to receive the data to be transmitted by the computing device, or could comprise all other computing devices in range of the computing device. In some embodiments of the invention, the transmission of act 420 will be done over a control frequency listened to by all devices using a specified protocol. Beacon signals may be transmitted using this control frequency, and in some embodiments the transmission of act 420 will be done as part of a beacon signal or other signal already in use. It should be appreciated, however, that embodiments of the invention may transmit this information in any suitable manner.

Once the list is stored and transmitted, the data is transmitted in act 422 over the connection using the selected sub-channels. These sub-channels, as discussed above, will not necessarily be contiguous, but will be any suitable sub-channels found by the process in any part of the spectrum, with a number of sub-channels being selected and transmitted on to achieve transmission at a desired data rate. It should be appreciated that the transmission over the sub-channels may be done in any suitable way and according to any suitable protocol, since the invention is not limited to being performed with any particular network implementation. In act 424, the process terminates. In embodiments of the invention, act 424 may comprise transmitting a second notification message to one or more other computing devices indicating that the computing device is no longer communicating over the selected sub-channels. In this way, the sub-channels that may have been reserved by the computing device may be released and thus made suitable for use by other computing devices.

It should be appreciated that the process illustrated in the flowchart of FIG. 4 is merely exemplary, and other processes or sequences of acts are possible. For example, an alternative embodiment of the invention may perform the loop beginning in act 404 prior to a connection being requested by an application. In this embodiment, the spectrum may be examined regularly by the computing device and indications of suitable sub-channels may be stored, such that when an application requests a connection, the desired number of sub-channels may be quickly assigned and used based on previously-determined sub-channel suitability, rather than making a determination when a connection is requested.

Embodiments of the invention may also operate in a low power mode, wherein the eligibility of sub-channels for transmission is farther restricted to a subset of the full spectrum. Restricting the number of sub-channels examined reduces the amount of power spent listening and determining, as well as the power spent configuring the computing device to transmit or receive at different frequencies (i.e., different sub-channels). The low power mode may be entered in response to user input or an operating state of the device such as operating on battery power, or in any other suitable way.

In the example of FIG. 4, processing is performed on a device that initiates a connection. Instead or in addition, a device intended to be an endpoint of a connection being established by another computing device may perform a process to select sub-channels. The computing device may examine the spectrum and reserve a set of sub-channels for it to receive data over, then send an announcement to all devices in range that it is listening over the selected sub-channels. Thereafter, devices wishing to transmit data to the computing device will transmit using those sub-channels. Endpoints of a connection could use the same or different sub-channels.

Embodiments of the invention may also execute fewer acts than are shown in FIG. 4. For example, embodiments of the invention may not store the list of selected sub-channels as done in act 418 or may not transmit the list of selected sub-channels to other devices, as in act 420. In some embodiments of the invention, acts 410 and 412 may be combined into a single act instead of separate acts.

It should be further appreciated that embodiments of the invention may execute more acts than are executed by the illustrative process of FIG. 4. In some embodiments of the invention, in addition to storing indications of sub-channels selected for transmission, the process may store more information such as a time or usage element. The time or usage element may comprise information regarding when a sub-channel may be released by the computing device or may comprise information on the conditions under which the sub-channel was selected.

In some embodiments of the invention, a list of sub-channels found to be unsuitable for transmission may be maintained for future use in selecting sub-channels for use in establishing a connection. In this way, sub-channels found to be unsuitable for communication may be avoided in the future. In an alternative embodiment of the invention, the list stored at act 418 may be updated at any point that a sub-channel is determined to be unsuitable. For example, if a sub-channel is in the list as being previously-selected, but is determined to be unsuitable, the sub-channel may be removed from the list or otherwise downgraded in the list. Any suitable technique for downgrading a sub-channel in the list may be used in accordance with embodiments of the invention, including moving the sub-channel lower in the list or otherwise indicating it as less suitable than other sub-channels.

It should also be appreciated that the sub-channels can be chosen for examination for suitability for communication in any suitable order. In some embodiments of the invention, order may be determined randomly, while in other embodiments, sub-channels may be ordered sequentially from one end of the spectrum to the other and sub-channels may be examined according to this order.

However, since some protocols use Frequency Division Multiplexing (FDM) across a very wide band of the spectrum, such as ultra wideband (UWB) communications or Worldwide Interoperability for Microwave Access (Wi-MAX), it may become costly in terms of time and processing to determine which sub-channels of the spectrum are free.

Therefore, in some embodiments of the invention, the order in which sub-channels are examined may be based on a cognitive process that makes use of data previously determined. The data may be obtained from the same computing device, other computing devices executing a similar process, or any other suitable source. In this embodiment, the cognitive aspect of the process refers to the act of "learning" from previously-determined information to aid in making determinations more easily, quickly, and efficiently.

Figure 5:
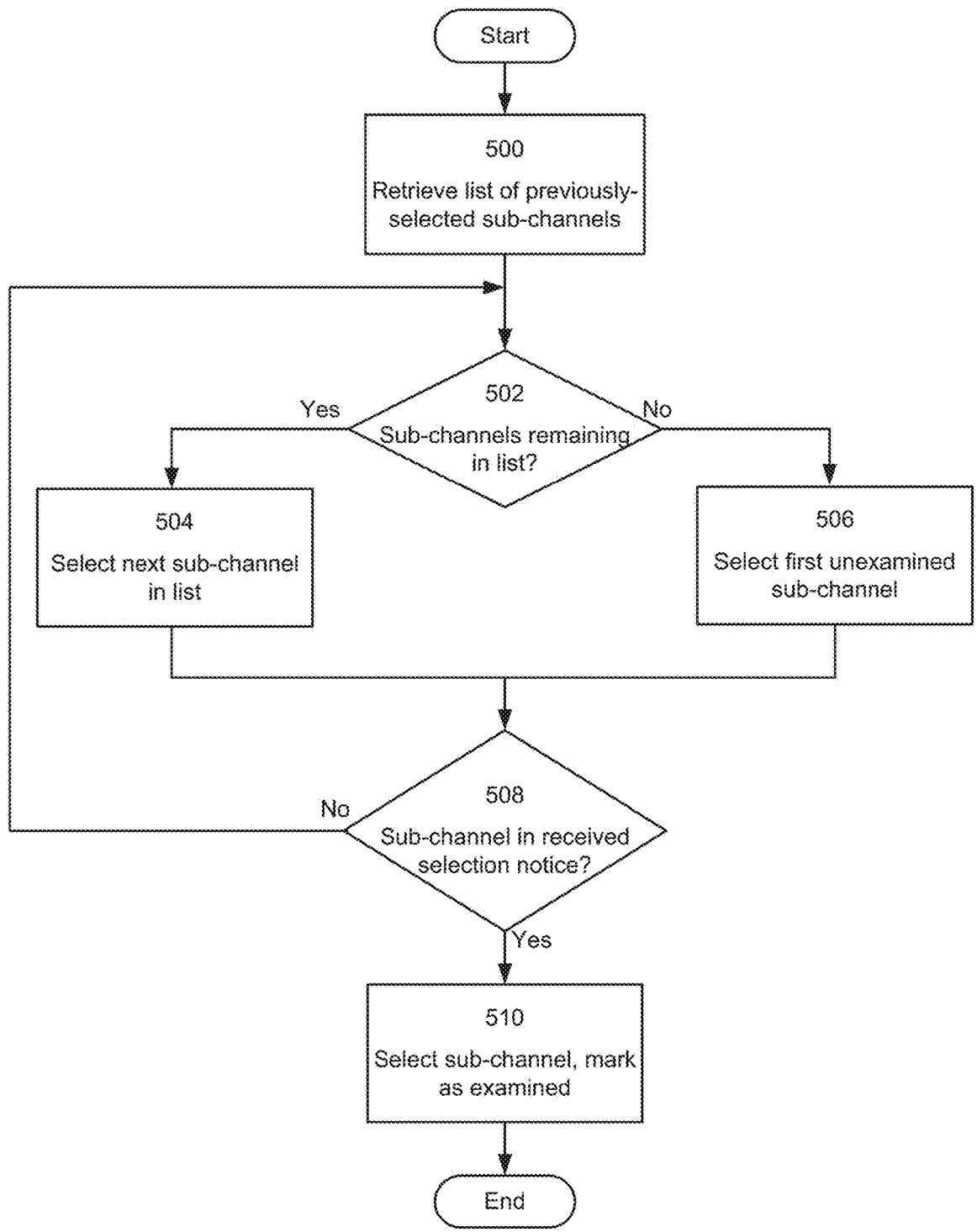
FIG. 5 is a flowchart of an illustrative process of selecting sub-channels to examine for suitability; and, FIG. 6 is a timeline of a randomized back-off process according to an embodiment of the invention that occurs when two computing devices transmit data over the same sub-channel.

An exemplary cognitive ordering process is illustrated in FIG. 5. A cognitive process may be implemented as a separate process executed prior to a selection process such as the one illustrated in FIG. 4 to predetermine the order in which sub-channels are to be examined, or may run jointly with a selection process to determine a sub-channel to examine next after a sub-channel has been examined, or may be executed at any suitable time and in any suitable manner.

In act 500, a list of previously-selected sub-channels (such as the one stored in act 418 of FIG. 4) is retrieved from storage on the computing device. This list of sub-channels may comprise sub-channels selected by the most-recently-executed selection process or may comprise information about sub-channels aggregated from more than one previous selection process. As an example of aggregated information, the list may be ordered by an index comprising the number of times a sub-channel has been determined to be suitable for communication, but it should be appreciated that embodiments of the invention may store any information compiled from any number of selection processes.

In act 502 the ordering process begins examining sub-channels in the list. The process may examine the sub-channels in the list sequentially, or may examine them based on an index such as the one described above. Once a sub-channel is selected from the list in act 504, it is checked in act 508 against any list of sub-channels indicated as currently selected by another computing device. The checking of act 508 may be enabled by an exchange of notification messages between computing devices in a network, where the notification messages comprise sets of sub-channels selected for communication. These sets of sub-channels may be exchanged in any suitable manner, including processes discussed above in conjunction with act 420 of FIG. 4.

If it is not indicated as selected by another computing device, then in act 510 the sub-channel is marked as examined and examined as discussed above in conjunction with FIG. 3 or in any other suitable manner. If, however, the sub-channel was indicated as selected by another device, then another sub-channel in the list may be selected in act 504 if it is determined in act 502 that more unexamined sub-channels exist in the list. The list may also be updated, with sub-channels that are being used by another device being removed from the list or otherwise downgraded.

If, in the process of examining, all the sub-channels in the list have been marked as examined in act 510 and a desired number of sub-channels has not yet been selected, then the process may examine in act 506 sub-channels not in the list. The order in which these sub-channels is examined may be done in any suitable manner, including a random ordering or a sequential ordering from the sub-channel with the lowest frequency to the sub-channel with the highest frequency. Sub-channels that have not yet been marked as examined by act 510 may be examined as discussed above in conjunction with FIG. 4, or in any other suitable manner, to determine if they are suitable for communication.

It should be appreciated that FIG. 5 is merely an illustrative process, and that embodiments of the invention are not limited to executing the process outlined in the figure.

Embodiments of the invention may execute different, more, or less acts than are shown in FIG. 5. For example, some embodiments of the invention may also implement an act of retrieving a list of sub-channels previously determined to be unsuitable for communication. This list may be used, for example, in choosing for examination sub-channels not in a list of previously-selected sub-channels.

In some alternative embodiments, act 508 of FIG. 5 may not involve comparing a sub-channel against a list of sub-channels received from another computing device. For example, such a comparison may not be made in embodiments in which computing devices do not reserve sub-channels by exchanging lists of selected sub-channels as illustrated by act 420 of FIG. 4. In these embodiments, processes may be implemented to handle conflicts when a computing device selects for transmission a sub-channel that has already been selected for transmission by another computing device.

Figure 6:
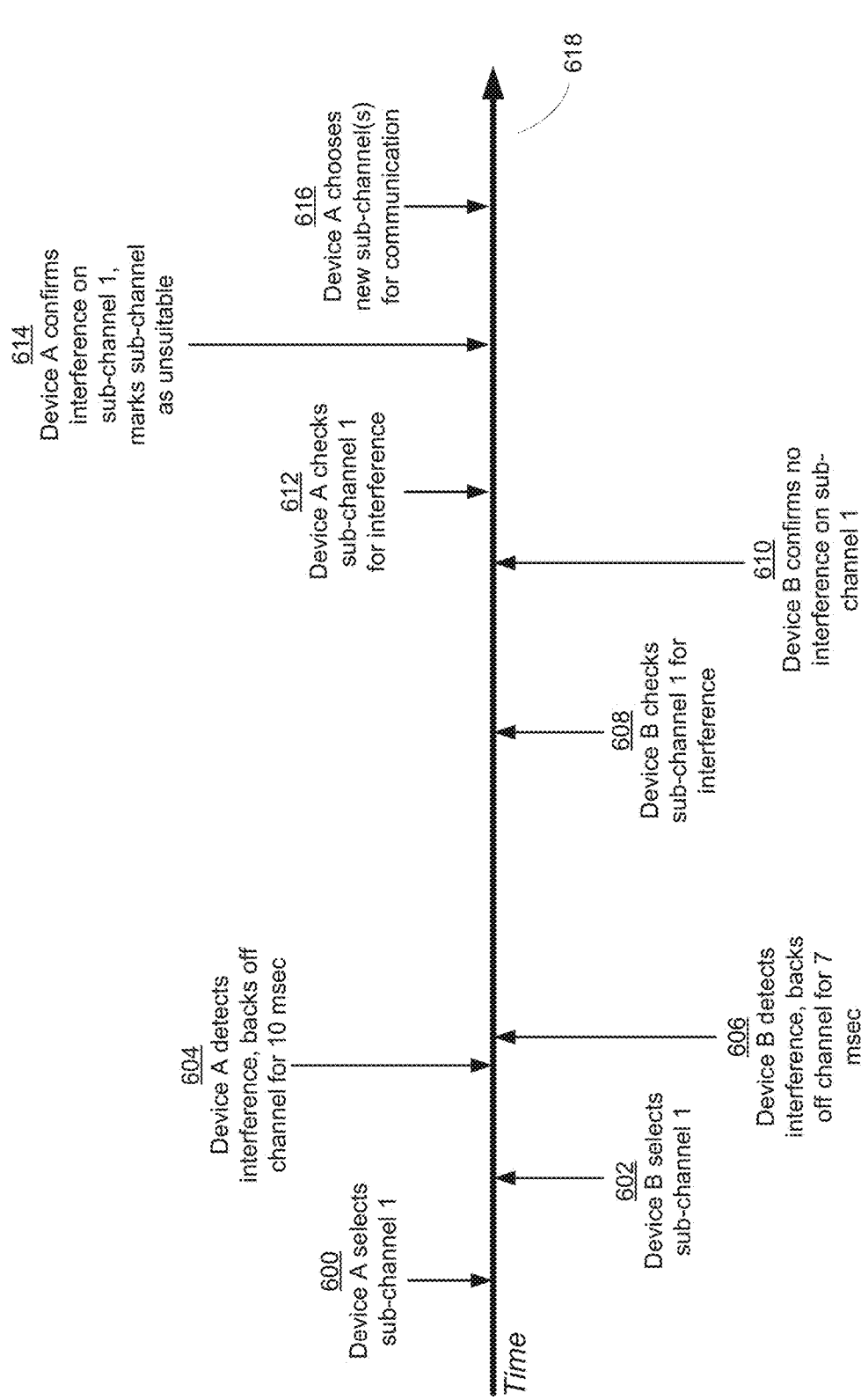

FIG. 6 shows an exemplary process for resolving conflicts that arise when two computing devices select the same sub-channel for transmission in terms of a timeline 618. In act 600, computing device A selects exemplary sub-channel 1 for transmission, according to any suitable method for selection, including techniques described above. In act 602, computing device B does not detect that device A has selected sub-channel 1 and also selects it for transmission. For example, computing device B may not detect device A because it performed its detection on sub-channel 1 during a time that device A was not transmitting. However, the reason why device B did not detect device A is not critical to the invention.

In act 604, device A detects interference on sub-channel 1, which, in the scenario illustrated, is caused by both devices trying to transmit on the sub-channel at the same time. In response, device A enters a waiting period wherein it does not transmit on that sub-channel for a random period of time. In act 606, device B also detects the interference and waits a random period of time. These random time values can be in any suitable range. In some embodiments of the invention, the wait times may be on the order of milliseconds, while other embodiments of the invention may implement wait times on the order of seconds. It should be appreciated, however, that the invention is not limited to implementing any specific range of time values for this random wait time.

Since these times are selected randomly, the waiting times will differ and the device with the shorter wait time will by to use the sub-channel again first. Because device B has the shorter waiting period, it is the first to check the sub-channel for interference in act 608, and in act 610 determines that the sub-channel is clear for transmission, at which point it begins transmitting its data again. In act 612, device A exits its waiting period and checks sub-channel 1 for interference, determining in act 614, that sub-channel 1 is being used by device B and is therefore unsuitable for transmission. Device A then proceeds to act 616, wherein it selects new sub-channels for communication. Such a selection can be done in any suitable manner, including the techniques discussed above.

It should be appreciated that the process illustrated in FIG. 6 is merely exemplary, and that embodiments of the invention are not limited to implementing such a process for resolving conflicts. Embodiments may implement more acts, such as storing a record of the interference in lists of previously-selected or previously-unsuitable sub-channels. It should further be appreciated that FIG. 6 illustrates a conflict between two devices for ease of explanation, but such a conflict may arise between any two or more computing devices.

The above-described embodiments of the present invention can be implemented in any of numerous ways. For example, the embodiments may be implemented using hardware, software, or a combination thereof. When implemented in software, the software code can be executed on any suitable processor or collection of processors, whether provided in a single computer or distributed among multiple computers.

Further, it should be appreciated that a computer or terminal may be embodied in any of a number of forms, such as a rack-mounted computer, a desktop computer, a laptop computer, or a tablet computer. Additionally, a computer or terminal may be embedded in a device not generally regarded as a computer but with suitable processing capabilities, including a Personal Digital Assistant (PDA), a smart phone, or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks, or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinary terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system comprising a computing device of a plurality of computing devices, the computing device comprising at least one processor and at least one program module that are together configured for performing actions for selecting sub-channels for transmitting data, comprising:
   setting at least one end condition by which, responsively to being met, a cognitive process for selecting the sub-channels is ended, the at least one end condition comprising reaching a predetermined count of sub-channels, each of which is below a predetermined interference threshold;
   executing a loop until the at least one end condition is met, the loop including the steps of:
      detecting, by the computing device, interference on a selected sub-channel;
      waiting, by the computing device, in response to the detecting, a period of time before checking the selected sub-channel for further interference;
      after waiting for the period of time, checking the selected sub-channel for further interference to thereby identify whether the selected sub-channel is below the pre-determined interference threshold;
      updating the count of sub-channels each time a sub-channel is identified that is below the predetermined interference threshold;
   responsive to meeting the end condition to thereby end the cognitive process, storing a list of sub-channels identified from the steps executed in the loop; and
   transmitting, by the computing device, data via one or more of the identified sub-channels.

2. The system of claim 1 where the interference or the further interference is due to another of the plurality of computing devices using the selected sub-channel.

3. The system of claim 1 where the interference or the further interference is due to the selected sub-channel being subjected to at least a threshold amount of electronic interference.

4. The system of claim 1 where the period of time is on an order of milliseconds.

5. The system of claim 1 where the period of time is of a random duration.

6. The system of claim 1 in which the actions further comprise setting at least a second end condition by which, when met, the cognitive process for selecting the sub-channels is ended, the second end condition comprising checking all sub-channels within a spectrum without finding any sub-channel that is below the predetermined interference threshold, and responsive to the cognitive process ending, making a request for a connection over which data is transmitted.

7. A method for selecting sub-channels for transmitting data performed by a computing device according to computer-executable instructions, the computing device of a plurality of computing devices, the computing device comprising at least one processor and memory, the method comprising:
   setting at least one end condition by which, responsively to being met, a cognitive process for selecting the sub-channels is ended, the at least one end condition comprising reaching a predetermined count of sub-channels, each of which is below a predetermined interference threshold;
   executing a loop until the least at one end condition is met, the loop including the steps of:
      detecting, by the computing device, interference on a selected sub-channel;
      waiting, by the computing device, in response to the detecting, a period of time before checking the selected sub-channel for further interference;
      after waiting for the period of time, checking the selected sub-channel for further interference to thereby identify whether the selected sub-channel is below the pre-determined interference threshold;
      updating the count of sub-channels each time a sub-channel is identified that is below the predetermined interference threshold;
   responsive to meeting the end condition to thereby end the cognitive process, storing a list of sub-channels identified from the steps executed in the loop; and
   transmitting, by the computing device, data via one or more of the identified sub-channels.

8. The method of claim 7 where the interference or the further interference is due to another of the plurality of computing devices using the selected sub-channel.

9. The method of claim 7 where the interference or the further interference is due to the selected sub-channel being subjected to at least a threshold amount of electronic interference.

10. The method of claim 7 where the period of time is on an order of milliseconds.

11. The method of claim 7 where the period of time is of a random duration.

12. The method of claim 7 further comprising setting at least a second end condition by which, when met, the cognitive process for selecting the sub-channels is ended, the second end condition comprising checking all sub-channels within a spectrum without finding any sub-channel that is below the predetermined interference threshold, and responsive to the cognitive process ending, making a request for a connection over which data is transmitted.

13. At least one hardware computer-readable medium comprising: a computer memory, the at least one computer-readable medium storing computer-executable instructions that, when executed by at least one processor of a computing device of a plurality of computing devices, cause the computing device to perform actions for selecting sub-channels for transmitting data, comprising:
setting at least one end condition by which, responsively to being met, a cognitive process for selecting the sub-channels is ended, the at least one end condition comprising reaching a predetermined count of sub-channels each of which is below a predetermined interference threshold;
executing a loop until the at least one end condition is met, the loop including the steps of:
detecting, by the computing device, interference on a selected sub-channel;
waiting, by the computing device, in response to the detecting, a period of time before checking the selected sub-channel for further interference;
after waiting for a period of time, checking the selected sub-channel for further interference to thereby identify whether the selected sub-channel is below the pre-determined interference threshold;
updating the count of sub-channels each time a sub-channel is identified that is below the predetermined interference threshold;
responsive to meeting the end condition to thereby end the cognitive process, storing a list of sub-channels identified from the steps executed in the loop; and
transmitting, by the computing device, data via one or more of the identified sub-channels.

14. The at least one hardware computer-readable medium of claim 13 where the interference or the further interference is due to another of the plurality of computing devices using the selected sub-channel.

15. The at least one hardware computer-readable medium of claim 13 where the interference or the further interference is due to the selected sub-channel being subjected to at least a threshold amount of electronic interference.

16. The at least one hardware computer-readable medium of claim 13 where the period of time is on an order of milliseconds.

17. The at least one hardware computer-readable medium of claim 13 where the period of time is of a random duration.

18. The at least one hardware computer-readable medium of claim 13, in which the executed instructions further cause the computing device to reserve, by the computing device in response to the checking indicating that the selected sub-channel is clear, the selected sub-channel for use by transmitting a message to the plurality of computing devices in range of the computing device.

19. The at least one hardware computer-readable medium of claim 13 in which the actions further comprise setting at least a second end condition by which, when met, the cognitive process for selecting the sub-channels is ended, the second end condition comprising checking all sub-channels within a spectrum without finding any sub-channel that is below the predetermined interference threshold, and responsive to the cognitive process ending, making a request for a connection over which data is transmitted.

* * * * *